United States Patent
Blahuta et al.

(10) Patent No.: US 11,926,777 B2
(45) Date of Patent: *Mar. 12, 2024

(54) SCINTILLATION COMPOUND INCLUDING A RARE EARTH ELEMENT AND A PROCESS OF FORMING THE SAME

(71) Applicant: LUXIUM SOLUTIONS, LLC, Hiram, OH (US)

(72) Inventors: Samuel Blahuta, Besancon (FR); Eric E. Mattmann, Paris (FR); Damien Pauwels, Mandelieu (FR); Bruno Viana, Montgeron (FR)

(73) Assignee: LUXIUM SOLUTIONS, LLC, Hiram, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,634

(22) Filed: May 23, 2022

(65) Prior Publication Data

US 2022/0290046 A1 Sep. 15, 2022

Related U.S. Application Data

(63) Continuation of application No. 17/128,297, filed on Dec. 21, 2020, now abandoned, which is a continuation of application No. 15/833,774, filed on Dec. 6, 2017, now Pat. No. 10,907,096, which is a continuation of application No. 14/856,159, filed on Sep. 16, 2015, now Pat. No. 9,868,900, which is a continuation of application No. 13/885,966, filed as application No. PCT/IB2011/003028 on Nov. 16, 2011, now abandoned, which is a continuation-in-part of application No. 12/977,947, filed on Dec. 23, 2010, now abandoned.

(60) Provisional application No. 61/540,326, filed on Sep. 28, 2011, provisional application No. 61/540,339, filed on Sep. 28, 2011.

(30) Foreign Application Priority Data

Nov. 16, 2010 (FR) ....................................... 1059394
Sep. 22, 2011 (FR) ....................................... 1158466
Sep. 22, 2011 (FR) ....................................... 1158467

(51) Int. Cl.
C09K 11/77 (2006.01)
G01T 1/20 (2006.01)
G01T 1/202 (2006.01)

(52) U.S. Cl.
CPC .. C09K 11/77742 (2021.01); C09K 11/77744 (2021.01); C09K 11/7792 (2013.01); G01T 1/20185 (2020.05); G01T 1/2023 (2013.01)

(58) Field of Classification Search
CPC ................ C09K 11/77742; G02T 1/2023
See application file for complete search history.

(56) References Cited

U.S. PATENT DOCUMENTS

| | | |
|---|---|---|
| 4,017,294 A | 4/1977 | Sanford et al. |
| 4,518,546 A | 5/1985 | Greskovich et al. |
| 4,747,973 A | 5/1988 | Cusano et al. |
| 4,958,080 A | 9/1990 | Melcher |
| 5,003,181 A | 3/1991 | Morlotti |
| 5,124,072 A | 6/1992 | Dole et al. |
| 5,264,154 A | 11/1993 | Akiyama et al. |
| 5,318,722 A | 6/1994 | Tsoukala |
| 5,521,387 A | 5/1996 | Riedner et al. |
| 5,998,925 A | 12/1999 | Shimizu et al. |
| 6,093,347 A | 7/2000 | Lynch et al. |
| 6,210,605 B1 | 4/2001 | Srivastava et al. |
| 6,278,832 B1 | 8/2001 | Zagumennyi et al. |

(Continued)

FOREIGN PATENT DOCUMENTS

| | | |
|---|---|---|
| CN | 1109112 A | 9/1995 |
| CN | 1390988 A | 1/2003 |

(Continued)

OTHER PUBLICATIONS

Aitasalo, Tuomas et al., "Delayed Luminescence of Ce3+ doped Y2SiO5," Optical Materials, Dec. 19, 2003, pp. 107-112, vol. 26, Elsevier.

Assefa, Zerihun et al., "Correlation of the oxidation state of cerium in sol-gel glasses as a function of thermal treatment via optical spectroscopy and XANES studies," Spectrochimica Acta Part A, Oct. 13, 2003, pp. 1873-1881, vol. 60, Elsevier.

Derenzo, Stephen et al., "Scintillation Properties," 14 pages, Lawrence Berkeley National Laboratory, Feb. 12, 2009, US, http://scintillator.lbl.gov.

Ding, Dongzhou et al., "Air Atmosphere Annealing Effects on LSO:Ce Crystal," IEEE Transaction on Nuclear Science, Jun. 1, 2010, pp. 1272-1277, vol. 57, No. 3, IEEE Service Center, New York, US.

(Continued)

*Primary Examiner* — C Melissa Koslow
(74) *Attorney, Agent, or Firm* — ABEL SCHILLINGER, LLP; John M. Frank

(57) ABSTRACT

A scintillation compound can include a rare earth element that is in a divalent ($RE^{2+}$) or a tetravalent state ($RE^{4+}$). The scintillation compound can include another element to allow for better change balance. The other element may be a principal constituent of the scintillation compound or may be a dopant or a co-dopant. In an embodiment, a metal element in a trivalent state ($M^{3+}$) may be replaced by $RE^{4+}$ and a metal element in a divalent state ($M^{2+}$). In another embodiment, $M^{3+}$ may be replaced by $RE^{2+}$ and $M^{4+}$. In a further embodiment, $M^{2+}$ may be replaced by a $RE^{3+}$ and a metal element in a monovalent state ($M^{1+}$). The metal element used for electronic charge balance may have a single valance state, rather than a plurality of valence states, to help reduce the likelihood that the valance state would change during formation of the scintillation compound.

11 Claims, 2 Drawing Sheets

(56) References Cited

U.S. PATENT DOCUMENTS

Figure 1:
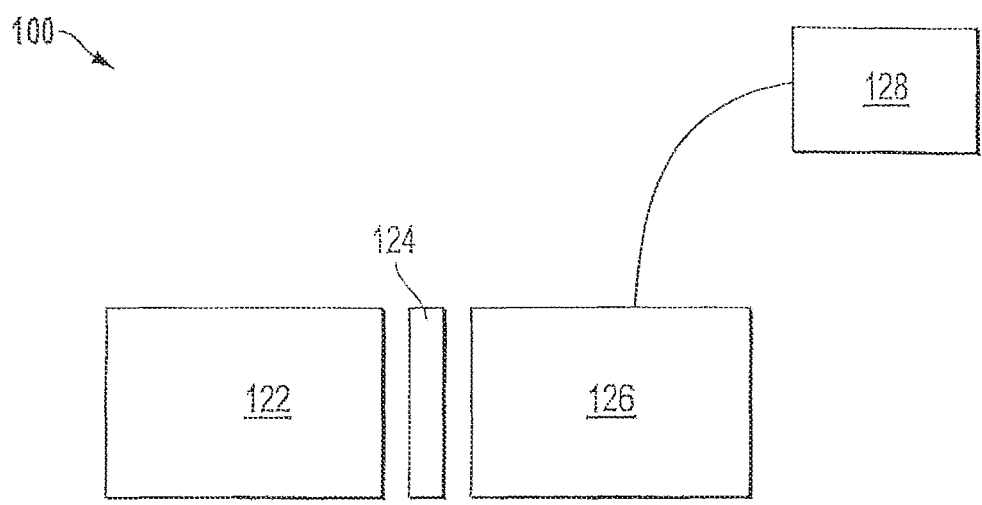

| | | |
|---|---|---|
| 6,323,489 B1 | 11/2001 | McClellan |
| 6,437,336 B1 | 8/2002 | Pauwels et al. |
| 6,498,828 B2 | 12/2002 | Jiang |
| 6,624,420 B1 | 9/2003 | Chai et al. |
| 6,818,896 B2 | 11/2004 | Pauwels et al. |
| 6,921,901 B1 | 7/2005 | Chai et al. |
| 6,967,330 B1 | 11/2005 | Lempicki et al. |
| 7,102,135 B2 | 9/2006 | Lecoq |
| 7,132,060 B2 | 11/2006 | Zagumennyi et al. |
| 7,138,074 B1 | 11/2006 | Nakamura |
| 7,151,261 B2 | 12/2006 | Chai |
| 7,166,845 B1 | 1/2007 | Chai |
| 7,180,068 B1 | 2/2007 | Brecher et al. |
| 7,397,034 B2 | 7/2008 | Chai et al. |
| 7,531,036 B2 | 5/2009 | Shimura et al. |
| 7,531,109 B2 | 5/2009 | Lacourse et al. |
| 7,595,492 B2 | 9/2009 | Nakamura et al. |
| 7,618,491 B2 | 11/2009 | Kurata et al. |
| 7,651,632 B2 | 1/2010 | Ferrand et al. |
| 7,692,153 B2 | 4/2010 | Shimizu et al. |
| 7,749,323 B2 | 7/2010 | Shimura et al. |
| 7,863,572 B1 | 1/2011 | Doty |
| 7,947,956 B2 | 5/2011 | Nakamura et al. |
| 8,034,258 B2 | 10/2011 | Ferrand et al. |
| 8,062,419 B1 | 11/2011 | Andreaco et al. |
| 8,158,948 B2 | 4/2012 | Chou |
| 8,278,624 B2 | 10/2012 | Koschan et al. |
| 8,394,195 B2 | 3/2013 | Andreaco et al. |
| 8,486,300 B2 | 7/2013 | Gundiah et al. |
| 8,574,458 B2 | 11/2013 | Ferrand et al. |
| 8,617,422 B2 | 12/2013 | Koschan et al. |
| 8,728,232 B2 | 5/2014 | Usui et al. |
| 8,999,281 B2 | 4/2015 | Kurata et al. |
| 9,328,288 B2 | 5/2016 | Cohen et al. |
| 9,534,170 B2 | 1/2017 | Ferrand et al. |
| 9,868,900 B2 * | 1/2018 | Blahuta ................. G01T 1/2018 |
| 10,094,048 B2 | 10/2018 | Chou |
| 10,890,670 B2 | 1/2021 | Ferrand et al. |
| 10,907,096 B2 * | 2/2021 | Blahuta ............ C09K 11/77742 |
| 2002/0144640 A1 | 10/2002 | Andreaco et al. |
| 2003/0020044 A1 | 1/2003 | Lyons et al. |
| 2003/0062465 A1 | 4/2003 | Pauwels et al. |
| 2003/0159643 A1 | 8/2003 | Sumiya et al. |
| 2004/0108492 A1 | 6/2004 | Derenzo et al. |
| 2004/0200964 A1 | 10/2004 | Lafaucheur et al. |
| 2004/0245479 A1 | 12/2004 | Misawa et al. |
| 2005/0082484 A1 | 4/2005 | Srivastava et al. |
| 2005/0104000 A1 | 5/2005 | Kindem et al. |
| 2005/0211906 A1 | 9/2005 | Tonami et al. |
| 2006/0086311 A1 | 4/2006 | Zagumennyi et al. |
| 2006/0266276 A1 | 11/2006 | Shimura et al. |
| 2006/0266277 A1 | 11/2006 | Usui et al. |
| 2006/0288926 A1 | 12/2006 | Kurata et al. |
| 2007/0209581 A1 | 9/2007 | Ferrand et al. |
| 2007/0210256 A1 | 9/2007 | Dorenbos et al. |
| 2008/0017802 A1 | 1/2008 | Nakamura et al. |
| 2008/0067391 A1 | 3/2008 | Shimizu et al. |
| 2008/0089824 A1 | 4/2008 | Shimura et al. |
| 2009/0029005 A1 | 1/2009 | Van Amerongen et al. |
| 2010/0078595 A1 | 4/2010 | Eriksson et al. |
| 2010/0327227 A1 | 12/2010 | Kurata et al. |
| 2011/0204240 A1 | 8/2011 | Chou |
| 2011/0293499 A1 | 12/2011 | Iltis |
| 2011/0297882 A1 | 12/2011 | Ferrand et al. |
| 2012/0119092 A1 | 5/2012 | Blahuta et al. |
| 2012/0126171 A1 | 5/2012 | Andreaco et al. |
| 2013/0327986 A1 | 12/2013 | Blahuta et al. |
| 2014/0061537 A1 | 3/2014 | Zagumennyi et al. |
| 2014/0291580 A1 | 10/2014 | Zagumennyi et al. |
| 2015/0069298 A1 | 3/2015 | Kurata et al. |
| 2016/0002529 A1 | 1/2016 | Blahuta et al. |
| 2016/0025263 A1 | 1/2016 | Gibbons et al. |
| 2016/0252631 A1 | 9/2016 | Blahuta et al. |

FOREIGN PATENT DOCUMENTS

| | | |
|---|---|---|
| CN | 1404522 A | 3/2003 |
| CN | 1636910 A | 7/2005 |
| CN | 1847469 A | 10/2006 |
| CN | 1926218 A | 3/2007 |
| CN | 101545140 A | 9/2009 |
| CN | 102477580 A | 5/2012 |
| CN | 1926218 B | 12/2012 |
| CN | 103975042 A | 8/2014 |
| CN | 105986320 A | 10/2016 |
| CN | 103249805 B | 2/2017 |
| CN | 108186041 A | 6/2018 |
| DE | 19950087 A1 | 5/2000 |
| DE | 112011103780 T5 | 8/2013 |
| EP | 0097296 B1 | 12/1986 |
| EP | 0097295 B1 | 1/1987 |
| EP | 0795631 A1 | 9/1997 |
| EP | 1028154 B1 | 9/2003 |
| EP | 1466955 A2 | 8/2004 |
| EP | 1707613 A1 | 4/2006 |
| EP | 2758489 B1 | 4/2016 |
| EP | 3091060 A1 | 11/2016 |
| FR | 2967421 B1 | 12/2012 |
| FR | 2967420 B1 | 1/2014 |
| GB | 2499343 A | 8/2013 |
| JP | H02300696 A | 12/1990 |
| JP | H04321600 A | 11/1992 |
| JP | H06287553 A | 10/1994 |
| JP | H07252476 A | 10/1995 |
| JP | 2000178554 A | 6/2000 |
| JP | 2001294853 A | 10/2001 |
| JP | 2001524163 A | 11/2001 |
| JP | 2003253255 A | 9/2003 |
| JP | 2004300418 A | 10/2004 |
| JP | 2004339506 A | 12/2004 |
| JP | 2006083275 A | 3/2006 |
| JP | 2006199727 A | 8/2006 |
| JP | 2006257199 A | 9/2006 |
| JP | 2007001849 A | 1/2007 |
| JP | 2007001850 A | 1/2007 |
| JP | 2007016197 A | 1/2007 |
| JP | 2007246653 A | 9/2007 |
| JP | 2008509270 A | 3/2008 |
| JP | 2009046598 A | 3/2009 |
| JP | 2014505742 A | 3/2014 |
| JP | 2014526587 A | 10/2014 |
| WO | 1999035512 A1 | 7/1999 |
| WO | 2004050792 A1 | 6/2004 |
| WO | 2005042812 A1 | 5/2005 |
| WO | 2006018586 A1 | 2/2006 |
| WO | 2006068130 A1 | 6/2006 |
| WO | 2006071236 A1 | 7/2006 |
| WO | WO 2010/136116 * | 12/2010 |
| WO | 2012066424 A1 | 5/2012 |
| WO | 2012066425 A2 | 5/2012 |
| WO | 2013041251 A2 | 3/2013 |
| WO | 2015185988 A1 | 12/2015 |

OTHER PUBLICATIONS

Dorenbos, P., "The 5d level positions of the trivalent lanthanides in inorganic compounds," Journal of Luminescence, Apr. 3, 2000, pp. 155-176, vol. 91, Elsevier.

Feng, He et al., "Annealing effects on Czochralski grown $Lu_2Si_2O_7$:$Ce^{3+}$ crystals under different atmospheres," Journal of Applied Physics, Apr. 22, 2008, p. 83109, vol. 103, No. 8, American Institute of Physics, New York, US.

Friedrich, Stephan et al., "A 36-Pixel Tunnel Junction Soft X-Ray Spectrometer for Scintillator Material Science," IEEE Transactions on Applied Superconductivity, Jun. 2007, pp. 351-354, vol. 17, No. 2, IEEE.

Hautefeuille, B. et al., "Shaped crystal growth of $Ce^{3+}$-doped $Lu_{2(1-x)}Y_{2x}SIO_5$ oxyorthosilicate for scintillator applications by pulling-down technique," Journal of Crystal Growth, Jan. 10, 2006, pp. 172-177, vol. 289, Elsevier.

(56) References Cited

OTHER PUBLICATIONS

He, Ming et al., "Growth and optical properties of YBa3B9O18:Ce crystals," Journal of Crystal Growth, Jun. 23, 2007, pp. 427-431, vol. 307, Elsevier.

International Search Report for PCT/EP2012/059055, dated Apr. 25, 2013, 28 pages.

International Search Report for PCT/IB2011/003026, dated Mar. 29, 2012, 16 pages.

International Search Report for PCT/IB2011/003028, dated Jun. 12, 2012, 12 pages.

Kurata, Y. et al., "Scintillation Characteristics of GSO Single Crystal Grown Under O2-Containing Atmosphere," IEEE Transactions on Nuclear Science, Aug. 1995, pp. 1038-1040, vol. 42, No. 4.

Mansuy, Christelle et al., "Molecular design of inorganic scintillators: from alkoxides to scintillating materials," Journal of Materials Chemistry, Jan. 1, 2004, p. 3274-3280, vol. 14, No. 21.

McKeever, "Thermoluminescence of solids," Cambridge Solid State Science Series, 1985, pp. 1-3, pp. 143-147, Cambridge University Press.

Melcher et al., "Czochralski growth of rare earth oxyorthosilicate single crystals," Journal of Crystal Growth, Mar. 1, 1993, pp. 1001-1005, vol. 128, No. 1-4, Elsevier, Amsterdam, NL.

Melcher, C. et al., "Cerium Oxidation State in LSO:Ce Scintillators," IEEE Transactions on Nuclear Science, Oct. 2005, pp. 1809-1812, vol. 52, No. 5.

Naik, Y.P. et al., "Synthesis and luminescence investigation of RE3+ (Eu3+, Tb3+ and Ce3+)-doped lithium silicate (Li2SiO3)," Journal of Luminescence, Jun. 7, 2009, pp. 1225-1229, vol. 129, Elsevier.

Peak, Jonathan D. et al., "Combinatorial thin film sputtering investigation of cerium concentration in Lu2SiO5 scintillators," Journal of Luminescence, Mar. 2, 2010, pp. 1366-1370, vol. 130, Elsevier.

Peter et al., "Etching studies on lutetium yttrium orthosilicate LuxY2-xSiO5:Ce (LYSO) scintillator crystals," 11th Europhysical Conference on Defects in Insulating Materials, 2010, pp. 1-6, IOP Publishing Ltd.

Potdevin, A. et al., "Structural, morphological and scintillation properties of Ce3+-doped Y3Al5O12 powders and films elaborated by the sol-gel process," Materials Chemistry and Physics, Jul. 7, 2011, pp. 500-506, vol. 130, Elsevier.

Preliminary Search Report for FR1059394, dated Jan. 28, 2011, 10 pages.

Shimura, N. et al., "Zr doped GSO:Ce single crystals and their scintillation performance," Oct. 2004, 4 pages.

Yang, Kan et al., "Effects of Calcium Codoping on Charge Traps in LSO:Ce Crystals," IEEE Transaction on Nuclear Science, Oct. 1, 2009, pp. 2960-2965, vol. 56, No. 5, IEEE Service Center, New York, US.

Yang, Kan et al., "Luminescence centers in calcium co-doped LSO:Ce single crystals," 2009 IEEE Nuclear Science Symposium and Medical Imaging Conference, Oct. 24, 2009, pp. 1-5, IEEE, Orlando, US.

Zavartsev, Yuri D. et al., "Czochralski growth and characterisation of large Ce3+:Lu2SiO5 single crystals co-doped with Mg2+ or Ca2+ or Tb3+ for scintillators," Journal of Crystal Growth, Jan. 1, 2005, pp. e2167-e2171, vol. 275, Elsevier.

Zhu, Fang et al., "The influence on intrinsic light emission of calcium tungstate and molybdate powders by multivalence PR codoping," Applied Physics A, Jul. 21, 2010, pp. 689-693, vol. 101, Springer-Verlag.

Alba et al., "Formation of High-Temperature Lutetium Disilicate from Lutetium-Saturated Aluminosilicates in Mild Conditions. Incorporation of Si and Al XAS Techniques to the Study of These Systems," 100 J. Phys. Chem. 50 19559-19567 (1996).

Blahuta, S. et al., "Evidence and Consequences of Ce4+ in LYSO: Ce, Ca and LYSO: Ce, Mg Single Crystals for Medical Imaging Applications," IEEE Transactions on Nuclear Science, vol. 60, No. 4, Aug. 2013, pp. 3134-3141.

Fleet Michael E. et al., "The Structure of NaCa2LuSi2O7F2, A Synthetic Phase of the Cuspidine Group," The Canadian Mineralogist, 1995, vol. 33, pp. 879-884.

Laishun Qin, et al., "Growth and characteristics of LYSO (Lu2(1-x-y)Y2xSiO5:Cey) scintillation crystals," Journal of Crystal Growth, vol. 281 (2005) pp. 518-524.

Letter from Allen, Dyer, Doppelt & Gilchrist, P.A. to Hill, Ward & Henderson, P.A. and Kirkland & Ellis, LLP re Saint-Gobain Cristaux et Detecteurs V. Crystal Photonics, Inc. Case, dated Sep. 16, 2021, 94 pgs.

* cited by examiner

SCINTILLATION COMPOUND INCLUDING A RARE EARTH ELEMENT AND A PROCESS OF FORMING THE SAME

CROSS-REFERENCE TO RELATED APPLICATION(S)

This application is a continuation of and claims priority to U.S. patent application Ser. No. 17/128,297, entitled "Scintillation Compound Including a Rare Earth Element and a Process of Forming The Same," by Samuel BLAHUTA et al., filed Dec. 21, 2020, now abandoned, which is a continuation of and claims priority to U.S. patent application Ser. No. 15/833,774, entitled "Scintillation Compound Including a Rare Earth Element and a Process of Forming The Same," by Samuel BLAHUTA et al., filed Dec. 6, 2017, now U.S. Pat. No. 10,907,096, which is a continuation of and claims priority to U.S. patent application Ser. No. 14/856,159, entitled "Scintillation Compound Including a Rare Earth Element and a Process of Forming The Same," by Samuel BLAHUTA et al., filed Sep. 16, 2015, now U.S. Pat. No. 9,868,900, which is a continuation of and claims priority to U.S. patent application Ser. No. 13/885,966, entitled "Scintillation Compound Including a Rare Earth Element and a Process of Forming The Same," by Samuel BLAHUTA et al., filed May 15, 2012, which has a 35 U.S.C. § 371 date of Aug. 20, 2013, now abandoned, which is a national stage entry under 35 U.S.C. § 371 of International Application No. PCT/IB2011/003028 filed Nov. 16, 2011, which claims priority to: French Patent Application No. 1059394 filed Nov. 16, 2010, French Patent Application No. 1158466 filed Sep. 22, 2011, and French Patent Application No. 1158467 filed Sep. 22, 2011; as a continuation-in-part of U.S. patent application Ser. No. 12/977,947 filed Dec. 23, 2010, now abandoned; and U.S. Provisional Application Nos. 61/540,326 filed Sep. 28, 2011 and 61/540,339 filed Sep. 28, 2011. All of the applications recited within this section are incorporated herein by reference in their entireties.

FIELD OF THE DISCLOSURE

The present disclosure is directed to scintillation compounds including rare earth elements, processes of forming them, and apparatuses having scintillators with such compounds.

RELATED ART

Scintillators can be used for medical imaging and for well logging in the oil and gas industry as well for the environment monitoring, security applications, and for nuclear physics analysis and applications. Scintillators include scintillation compounds that include rare earth elements, wherein the rare earth element can be a dopant or as a principal constituent within the compound. Further improvement of scintillation compounds is desired.

BRIEF DESCRIPTION OF THE DRAWING(S)

Embodiments are illustrated by way of example and are not limited in the accompanying figures.

FIG. 1 includes an illustration of an apparatus including a scintillator having a scintillation compound in accordance with an embodiment.

Figure 2:
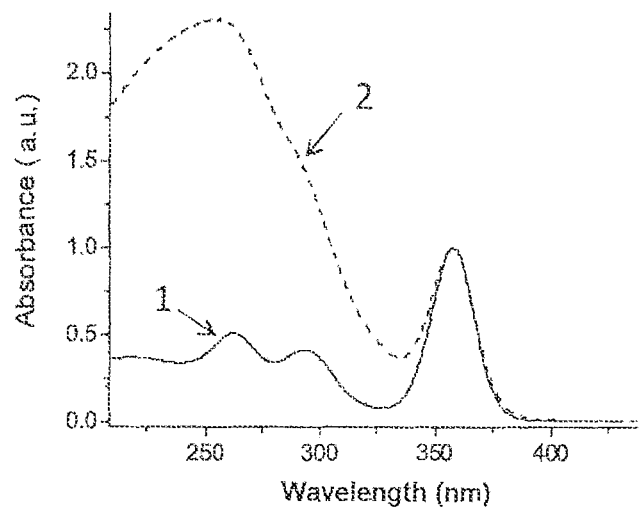

FIG. 2 includes an absorbance spectrum for a sample that is annealed and another sample that is not annealed.

Figure 3:
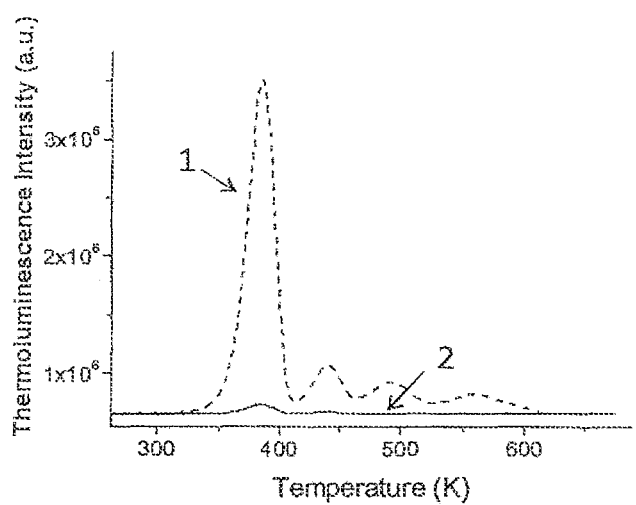

FIG. 3 includes plots thermoluminescence intensity for a sample that is annealed and another sample that is not annealed.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. Group numbers corresponding to columns within the Periodic Table of the Elements use the "New Notation" convention as seen in the CRC Handbook of Chemistry and Physics, 81$^{st}$ Edition (2000).

As used in this specification, color space is expressed in terms of L*, a*, and b* coordinates as specified by the Commission Internationale de l'éclairage ("CIE") 1976. The three coordinates represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow).

The letter "M," when referring to a particular element within a compound, is intended to mean a metal element. For example, $M^{2+}$ is used to represent a divalent metal. $M^{3+}$ is used to represent a trivalent metal, which in an embodiment, may be a rare earth element, and in another embodiment, may be a trivalent metal other than a rare earth element, such as Al, Ga, Sc, In, or the like.

The term "principal constituent," when referring to a particular element within a compound, is intended to that the element is present as part of the molecular formula for the compound, as opposed to a dopant. A dopant within a compound is typically present at a concentration no greater than 5% atomic. As an example, Ce-doped $LaBr_3$ ($LaBr_3$:Ce) includes La and Br are principal constituents, and Ce as a dopant and not a principal constituent.

The term "rare earth" or "rare earth element" is intended to mean Y, La, and the Lanthanides (Ce to Lu) in the Periodic Table of the Elements. In chemical formulas, a rare earth element will be represented by "RE." Rare earth elements are in a trivalent state unless explicitly noted otherwise. Thus, RE (without a valance state designation) and $RE^{3+}$ can be used interchangeably. Each of the individual rare earth elements are used in a similar manner (for example, Ce is interchangeable with $Ce^{3+}$, Eu in interchangeable with $Eu^{3+}$, and the like).

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A scintillator can include scintillation compound that includes a rare earth element. The rare earth element may be present in the scintillation compound as a principal constituent or as a dopant. In a particular scintillation compound, a particular rare earth element can be a constituent, and a different rare earth element can be a dopant. For example, $Cs_2LiLuCl_6$:Ce includes Lu as a principal constituent and Ce as a dopant. When present as a dopant, the rare earth element may present within a scintillation compound at a concentration of at least approximately 1000 ppm atomic or at least approximately 5000 ppm atomic in an embodiment, and in another embodiment, may be no greater than approximately 200,000 ppm atomic or no greater than approximately 100,000 ppm atomic.

The rare earth elements can be in a trivalent state. Some of the rare earth elements may be in a tetravalent state, such as Ce, Pr, and Tb, and other rare earth elements can include a divalent state, such as Nd, Sm, Eu, Dy, Tm, and Yb. Such elements may be useful as part of the scintillation mechanism for the scintillation compound. By having a significant amount of a rare earth element in a divalent or tetravalent state, a step in the scintillation process may be obviated.

Too much of the rare earth element in the divalent or tetravalent state may cause electronic charge imbalance and may potentially cause electron or hole traps or other undesired affects to occur. Visible evidence of the electronic charge imbalance may be observed as a change in the color of the crystal. A scintillation compound that may be substantially clear may become more yellow or orange upon visual inspection. In order to maintain electronic charge balance, another element with a different valance state can be present to help keep the overall charge in the scintillation compound balanced. In theory, all of a principal constituent may be replaced by rare earth element in a divalent, trivalent, or a tetravalent state and another element in a monovalent, divalent, or tetravalent state.

Although not required, such other element may have only one valance state to better allow the rare earth metal element to remain in its desired valence state. For example, The Group 2 elements and Zn are in a divalent state and do not have a monovalent or trivalent state. Unlike the Group 2 elements and Zn, other metal elements have more than one valence state, such as Cu, Ti, Fe, and many of the rare earth elements. While such other metal elements are not excluded, their presence may cause an undesired reduction-oxidation (redox) reaction.

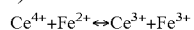

$Ce^{4+}+Fe^{2+} \leftrightarrow Ce^{3+}+Fe^{3+}$

In the equation above, $Ce^{4+}$ may be desired but the redox reaction may lower the concentration of $Ce^{4+}$ in the scintillation compound and such lower concentration may be undesired.

Scintillation compounds as described using the concepts herein may have a high light output, lower energy resolution, lower afterglow, better proportionality, shorter decay time or any combination thereof may be achieved, as compared to a corresponding scintillation compound with rare earth element(s) only in a trivalent state and without other elements that are added to affect the electronic charge.

1. Replacement of a $M^{3+}$ Principal Constituent or Dopant with $RE^{4+}$ and $M^{2+}$ A metal element in a trivalent state (generally noted as $M^{3+}$), which may or may not include a rare earth element in a trivalent state, can be principal constituent or dopant in a scintillation compound and be replaced by a rare earth element in a tetravalent state ($RE^{4+}$) and an element in a divalent state ($M^{2+}$), such as a Group 2 element (alkaline earth metals), or any combination thereof. $Lu_3Al_5O_{12}$:Ce is a scintillator compound and may have some or all of Lu, Al, or Ce replaced by a combination of $RE^{4+}$ and $M^{2+}$. In a non-limiting example, the scintillator compound can be represented by $Lu_{(3-x-y)}RE^{4+}_xCa_yAlsO_{12}$. $RE^{4+}$ can represent a single rare earth element or a combination of rare earth elements in the tetravalent state. In a particular example, $RE^{4+}$ may be $Ce^{4+}$, $Pr^{4+}$, $Tb^{4+}$, or a combination thereof. Ca may partly or completely be replaced by another Group 2 element, such as Mg or Sr, or Zn. Part of the Al may have been replaced by a combination of the $RE^{4+}$ and Ca in place of or addition to Lu.

In an embodiment, values for x and y may be selected such that $RE^{4+}$, $M^{2+}$, or each of both may be at least approximately 10 ppm atomic, at least approximately 11 ppm atomic, at least approximately 20 ppm atomic, at least approximately 50 ppm atomic, at least approximately 60 ppm atomic, at least approximately 110 ppm atomic, at least approximately 150 ppm atomic, or at least approximately 200 ppm atomic of the scintillation compound. In another embodiment, values for x and y may be selected such that the rare earth element in the tetravalent state, the element in the divalent state, or each of both may be no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

$RE^{4+}$ and $M^{2+}$ may be added in equal atomic amounts; however, equal amounts of $RE^{4+}$ and $M^{2+}$ are not required. In a further embodiment, on a relative basis, a ratio of $RE^{4+}$:$M^{2+}$ is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1. In a still a further embodiment, on a relative basis, a ratio of $RE^{4+}$:$M^{2+}$ is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Further, in $Lu_3Al_5O_{12}$:Ce, the Ce doping can be partly or completely replaced by $RE^{4+}$ and $M^{2+}$. When $RE^{4+}$ is $Ce^{4+}$, the amount of $Ce^{4+}$ may be expressed as a fraction of total cerium content. In an embodiment, $Ce^{4+}$ is at least approximately 5%, at least approximately 11%, at least approximately 15%, at least approximately 20%, at least approximately 35%, or at least approximately 30% of the total cerium content of within the scintillation compound. In another embodiment, $Ce^{4+}$ is no greater than approximately 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total cerium ($Ce^{4+}$ and Ce) content within the scintillation compound.

In another embodiment, a different divalent metal atom may not be further added, as such a divalent metal atom can be present as a principal constituent. For example, $BaLaB_7O_{13}$ already has a divalent metal element, namely Ba, present in the scintillation compound. In this embodiment, $RE^{4+}$ can be substituted for part of the La. For example, $BaLa_{(1-x)}RE^{4+}{}_xB_7O_{13}$ can be an exemplary compound. Thus, because a divalent is already present, additional Ba may not be required.

Clearly, the replacement of $M^{3+}$ with $RE^{4+}$ and $M^{2+}$ is not limited to the particular scintillation compounds described above. For example, in a YAG composition may have some of the Y replaced by a combination of $RE^{4+}$ and $M^{2+}$ in the form of co-dopants, such as $Y_3Al_5O_{12}$:$Pr^{4+}$,Ca. Later in this specification, other scintillation compounds are described, and, with such other scintillation compounds, a particular or combination of metal elements in a trivalent state may be partly or completely replaced by a rare earth element in a tetravalent state and a metal element in a divalent state.

2. Replacement of a $M^{3+}$ Principal Constituent or Dopant with $RE^{2+}$ and $M^{4+}$ A rare earth element or another trivalent element can be principal constituent or dopant in a scintillation compound and be replaced by a rare earth element in a divalent state ($RE^{2+}$) and an element in a tetravalent state ($M^{4+}$), such as Zr, Hf, or any combination thereof. $BaAl_{10}MgO_{17}$ is a scintillation compound and may have some or all of Al replaced by a combination of $RE^{2+}$ and $M^{4+}$. In a non-limiting example, the scintillation compound can be represented by $BaAl_{(10-x-y)}RE^{2+}{}_xHf_yMgO_{17}$. $RE^{2+}$ can represent a single rare earth element or a combination of rare elements in the divalent state. In a particular example, $RE^{2+}$ may be $Nd^{2+}$, $Sm^{2+}$, $Eu^{2+}$, $Dy^{2+}$, $Tm^{2+}$, $Yb^{2+}$, or a combination thereof. Hf may partly or completely replaced by Zr.

In an embodiment, values for x and y may be selected such that $RE^{2+}$, $M^{4+}$, or each of both may be at least approximately 10 ppm atomic, at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the scintillation compound. In another embodiment, values for x and y may be selected such that the rare earth element in the tetravalent state, the element in the divalent state, or each of both may be no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

$RE^{2+}$ and $M^{4+}$ may be added in equal atomic amounts; however, equal amounts of $RE^{2+}$ and $M^{4+}$ are not required. In a further embodiment, on a relative basis, a ratio of $RE^{2+}$:$M^{4+}$ is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1. In a still a further embodiment, on a relative basis, a ratio of $RE^{2+}$:$M^{4+}$ is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Further, $BaAl_{10}MgO_{17}$:Eu, the Eu doping can be partly or completely replaced by $RE^{2+}$ and $M^{4+}$. When $RE^{2+}$ is $Eu^{2+}$, the amount of $Eu^{2+}$ may be expressed as a fraction of total europium content. In an embodiment, $Eu^{2+}$ is at least approximately 5%, at least approximately 11%, at least approximately 15%, at least approximately 20%, at least approximately 35%, or at least approximately 30% of the total cerium content of within the scintillation compound. In another embodiment, $Eu^{2+}$ is no greater than approximately 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total europium content within the scintillation compound.

In another embodiment, a different tetravalent metal atom may not be further added, as such a divalent metal atom can be present as a principal constituent. For example, $CaHfO_3$ already has a tetravalent metal element, namely Hf, present in the scintillation compound. In this embodiment, $RE^{2+}$ can be substituted for part of the Ca. For example, $Ca_{(1-x)}RE^{2+}{}_x HfO_3$ can be an exemplary compound. Thus, because a tetravalent is already present, additional Hf may not be required.

Clearly, the replacement of $M^{3+}$ with $RE^{2+}$ and $M^{4+}$ is not limited to the particular scintillation compounds described above. For example, $GdCl_3$ may have some of the Gd replaced by a combination of $RE^{2+}$ and $M^{4+}$ in the form of co-dopants, such as $GdCl_3$:$Eu^{2+}$,Zr. Later in this specification, other scintillation compounds are described, and, with such other scintillation compounds, a particular or combination of metal elements in a trivalent state may be partly or completely replaced by a rare earth element in a divalent state and a metal element in a tetravalent state.

3. Replacement of a $M^{2+}$ Principal Constituent or Dopant with $RE^{3+}$ and $M^{1+}$ A Group 2 element is in a divalent state and can be principal constituents in a scintillation compound. The Group 2 element may be replaced in part with a combination of $RE^{3+}$ and $M^{1+}$, such as a Group 1 element (alkali metal), Ag, or any combination thereof. BaFI is an example of a scintillator compound. Some of the Ba can be replaced by $RE^{3+}$ and $M^{1+}$. In a non-limiting example, the scintillator compound can be represented by $Ba_{(1-x-y)}RE^{3+}{}_xK_yFI$. $RE^{3+}$ can represent a single rare earth element or a combination of rare earth elements in a trivalent state. K may be partly or completely replaced by another Group 1 element or Ag.

In an embodiment, values for x and y may be selected such that $RE^{3+}$, $M^{1+}$, or each of both may be at least approximately 10 ppm atomic, at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the scintillation compound. In another embodiment, values for x and y may be selected such that the rare earth element in the tetravalent state, the element in the divalent state, or each of both may be no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

$RE_{3+}$ and $M^{1+}$ may be added in equal atomic amounts; however, equal amounts of $RE^{3+}$ and $M^{1+}$ are not required. In a further embodiment, on a relative basis, a ratio of $RE^{3+}:M^{1+}$ is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1. In a still a further embodiment, on a relative basis, a ratio of $RE:M^{1+}$ is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Further, in $BaFI:Eu^{2+}$, the $Eu^{2+}$ doping can be partly or completely replaced by $RE^{3+}$ and $M^{1+}$. When $RE^{3+}$ is $Eu^{3+}$, the amount of $Eu^{3+}$ may be expressed as a fraction of total europium content. In an embodiment, $Eu^{3+}$ is at least approximately 5%, at least approximately 11%, at least approximately 15%, at least approximately 20%, at least approximately 35%, or at least approximately 30% of the total europium content of within the scintillation compound. In another embodiment, $Eu^{3+}$ is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total europium ($Eu^{2+}$ and $Eu^{3+}$) content within the scintillation compound.

In another embodiment, a different monovalent metal atom may not be further added, as such a divalent metal atom can be present as a principal constituent. For example, $BaKPO_4$ already has a monovalent metal element, namely K, present in the scintillation compound. In this embodiment, $RE^{3+}$ can be substituted for part of the Ba. For example, $Ba_{(1-x)}RE^{3+}_{x}KPO_4$ can be an exemplary compound. Thus, because a monovalent is already present, additional K may not be required.

Clearly, the replacement of $M^{2+}$ with $RE^{3+}$ and $M^{1+}$ is not limited to the particular scintillation compounds described above. For example, $NaSrPO_4$ may have some of the Sr replaced by a combination of $RE^{3+}$ and $M^{1+}$ in the form of co-dopants, such as $NaSrPO_4:Eu^{3+},K$. Later in this specification, other scintillation compounds are described, and, with such other scintillation compounds, a particular or combination of metal elements in a divalent state may be partly or completely replaced by a rare earth element in a trivalent state and a metal element in a monovalent state.

The $RE^{2+}$, $RE^{3+}$ and $RE^{4+}$ content can be measured using X-ray Absorption Near-Edge Spectroscopy (XANES). This measurement can be performed with synchrotron equipment. An X-ray beam goes through the sample and through one or more references containing only $RE^{2+}$, $RE^{3+}$ or $RE^{4+}$. The obtained XANES spectra of the sample can be easily fitted with a linear combination of that of the chosen references to confirm the presence of $RE^{2+}$, $RE^{3+}$ and/or $RE^{4+}$, and to measure the relative content of $RE^{2+}$, $RE^{3+}$ and $RE^{4+}$. For cerium, $CeF_3$ or $Ce(NO_3)_3$ may be used as a $Ce^{3+}$ reference, and $CeO_2$ may be used as a $Ce^{4+}$ reference. Another way to determine the presence of $Ce^{4+}$ can include measuring the absorbance (also called the optical density) of a crystal and determining a ratio of the absorbance of the crystal at 357 nm to the absorbance of the crystal at 280 nm, referenced $A_{357}/A_{280}$.

4. Exemplary Compounds

The concepts as described herein are applicable to a many different scintillation compounds. Many different formulas for scintillation compounds are provided herein. Particular notations are used particular types of elements. For example, RE can be used to represent a single rare earth element or a combination of rare earth elements, and Ln can be used to represent a single rare earth element or a combination of rare earth elements that is different from RE. M can be used to represent a single metal element or a combination of metal elements. In any of the formulas below, M may include one or more rare earth elements; alternatively, in any of the formulas below, M may not include any rare earth element. In formulas where a valance state is provided, a corresponding element may only have that valence state (e.g., $M^{2+}$ may be an alkaline earth element, $M^{4+}$ may be Hf or Zr).

In an embodiment, the scintillation compound can be a metal-silicon-oxygen compound. The metal-silicon-oxygen compound may be a metal oxyorthosilicate, a metal pyrosilicate, or the like. The scintillation compound can be a mixed metal oxyorthosilicate or pyrosilicate, wherein the metal oxyorthosilicate or pyrosilicate includes a combination of metals as principal constituents. In an embodiment the scintillation compound can be a Group 2 metal oxyorthosilicate or a Group 2 pyrosilicate or a rare earth metal oxyorthosilicate or rare earth metal pyrosilicate.

Below are non-limiting, exemplary formulas for families of compounds.

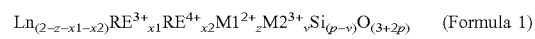  (Formula 1)

wherein:

Ln is a rare earth different than RE;

M1 represents a divalent alkaline-earth element;

M2 represents a trivalent element, such as Al, Ga, Sc, or In;

(z+v) is greater than or equal to 0.0001 and lower than or equal to 0.2;

z is greater than or equal to 0 and lower than or equal to 0.2;

v is greater than or equal to 0 and lower than or equal to 0.2;

x1 is greater than or equal to 0.00005 and lower than 0.1;

x2 is greater than or equal to 0.00005 and lower than 0.1;

x2/(x1+x2) is greater than or equal to 0.05 and lower than 1;

x1+x2 is lower than 0.1; and p equals 1 (orthosilicate) or 2 (pyrosilicate).

In an embodiment, x1 is greater than or equal to 0.0005, and x2 is greater than or equal to 0.0005. In a particular embodiment, x1 is lower than 0.01, and in another embodiment, x2 is lower than 0.01. In a further particular embodiment, z can be lower than or equal to 0.1, and in another further embodiment, z is greater than or equal to 0.00003 or can be at least 0.0001. In another embodiment, x2/(x1+x2) is greater than or equal to 0.1 and lower than or equal to 0.8.

In still a further embodiment, the divalent alkaline-earth metal may be at a concentration in a range of approximately 2500 ppm atomic to approximately 150,000 ppm atomic, and in yet a further embodiment, the trivalent metal may be at a concentration in a range of approximately 5000 ppm atomic to approximately 250,000 ppm atomic. On a mass basis, the sum of masses of the non-rare earth dopants may be less than the mass of the rare earth dopant. Referring to Formula 1, the combined mass of $M1^{2+}$ and $M2^{3+}$ is less than the combined mass of $RE^{3+}$ and $RE^{4+}$. In a particular embodiment, the sum of masses of the non-rare earth dopants may be less than 0.1 times the mass of the rare earth dopant (for example, cerium).

In still another embodiment, RE can be cerium or praseodymium, and referring to Formula 1:

Ln is Y, La, Gd, Er, Ho, or Lu;
M1 is Ca, Mg, Sr, or Ba;
z is greater than or equal to 0.00003 and lower than or equal to 0.1;
x1 is greater than or equal to 0.00005 and lower than or equal to 0.01;
x2 is greater than or equal to 0.00005 and lower than or equal to 0.01;
x2/(x1+x2) is greater than or equal to 0.1 and lower than or equal to 1.

In still a further embodiment, the trivalent metal ($M2^{3+}$) may not be present (i.e., v is zero), and z can be at least 0.0001.

A scintillation compound in accordance with Formula 1 can have an absorbance at the wavelength of 357 nm that is less than its absorbance at 280 nm. This absorbance property suggests that $Ce^{4+}$ is present in a quantity great enough to improve (reduce) the afterglow. The absorbances at the wavelengths of 357 nm and 280 nm can be compared after subtracting the background noise. The scintillation compound can have an afterglow intensity lower than 200 ppm after 100 ms as compared to its intensity measured during an X-ray excitation.

Other particular formulas for rare earth silicates are set forth below. After reading this specification, skilled artisans will appreciate that the particular formulas are merely exemplary and do not limit the scope of the present invention.

(Formula 2)

wherein:
Ln is a rare earth;
M is a divalent alkaline earth element, such as Ca, Mg, Sr, or Ba;
M' is a trivalent metal, such as Al, Ga, Sc, or In;
(z+v) is greater than or equal to 0.0001 and less than or equal to 0.2;
z is greater than or equal to 0 and less than or equal to 0.2;
v is greater than or equal to 0 and less than or equal to 0.2;
x is greater than or equal to 0.0001 and less than 0.1;
p is equal to 1 or 2.

In this formula, x represents the sum of ratios of $Ce^{3+}$ and $Ce^{4+}$, which are respectively x1 and x2 (x=x1+x2). In an embodiment, z can be greater than 0.00003 and even 0.0001. In another embodiment, x1 is greater than or equal to 0.00005 and lower than 0.1. In a further embodiment, x2 is greater than or equal to 0.00005 and lower than 0.1. The scintillation composition may have an absorbance at the wavelength of 357 nm lower than its absorbance at 280 nm, and an afterglow lower than 200 ppm after 100 ms as compared to the intensity measured during an X-ray excitation.

The concepts as described herein are particularly suitable for reducing the afterglow of compositions of lutetium orthosilicate (namely LSO) and lutetium yttrium orthosilicate (namely LYSO). Such compositions when doped with cerium may have the formula:

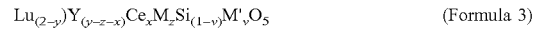
(Formula 3)

wherein:
M is a divalent alkaline-earth element, such as Ca, Mg, Sr, or Ba; and
M' is a trivalent metal, such as Al, Ga, Sc, or In;
(z+v) is greater than or equal to 0.0001 and less than or equal to 0.2;
z is greater than or equal to 0 and less than or equal to 0.2;
v is greater than or equal to 0 and less than or equal to 0.2;
x is greater than or equal to 0.0001 and less than 0.1; and
y is from (x+z) to 1.

In an embodiment, z can be greater than 0.00003 and even greater than 0.0001, and in another embodiment, z can be lower than or equal to 0.1. In still another embodiment, (z+v) is greater than or equal to 0.0002, and in yet another embodiment, (z+v) is less than or equal to 0.05, and in a more embodiment, less than or equal to 0.01, and may even be less than 0.001.

In this formula, x represents the sum of values of $Ce^{3+}$ and $Ce^{4+}$, which are respectively x1 and x2 (x=x1+x2). In a particular embodiment, the value for x1 of $Ce^{3+}$ is greater than or equal to 0.00005 and lower than 0.1. In another embodiment, the value for x2 of $Ce^{4+}$ is greater than or equal to 0.00005 and lower than 0.1.

In a particular embodiment, y may range from 0.08 to 0.3.

In another particular embodiment, v may be zero (absence of M'). The scintillating composition may be such that M is Ca, corresponding to a particularly suitable composition. In a more particular embodiment, v is zero, and M is Ca, and has the following formula:

(Formula 4)

In a different embodiment, z is zero (i.e., no divalent alkaline earth metal element), and M' is Al. Such a composition has the following formula:

(Formula 5)

In another different embodiment, v is zero, and M is Sr. Such a composition has the following formula:

(Formula 6)

In Formulas 4 to 6, x represents the amount in Ce, i.e., the sum of amounts of $Ce^{3+}$ and $Ce^{4+}$, which are respectively x1 and x2 (x=x1+x2). For these orthosilicates the molar content of the element O is substantially five times that of (Si+M'), it being understood that this value may vary by about ±2%.

In other embodiments, the scintillation composition can include another metal-silicon-oxygen compound. Exemplary, non-limiting formulas are provided below.

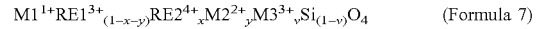
(Formula 7)

wherein:
$M1^{1+}$ is a monovalent metal element;
$M2^{2+}$ is a divalent metal element;
$M3^{2+}$ is a trivalent metal element, such as Al, Ga, Sc, or In;
$RE1^{3+}$ is a trivalent rare earth element;
$RE2^{4+}$ is a tetravalent rare earth element;

each of v, x, y, and z is greater than or equal to 0 and less than or equal to 0.2; and (x+y) is greater than or equal to 0.0001 and less than 0.2.

$$M1^{1+}RE1^{3+}_{(1-x-y)}RE2^{2+}_xM2^{4+}_yM3^{3+}_vSi_{(1-v)}O_4 \quad \text{(Formula 8)}$$

wherein:
M1$^{1+}$ is a monovalent metal element;
M2$^{4+}$ is a tetravalent metal element;
M3$^{2+}$ is a trivalent metal element, such as Al, Ga, Sc, or In;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$M1^{2+}_2M2^{3+}_vSi_{(1-v)}O:RE1^{3+}_{(z-a-b)}RE2^{2+}_aM3^{1+}_b \quad \text{(Formula 9)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}M2^{3+}_vSi_{(1-v)}O_3:RE1^{3+}_{(z-a-b)}RE2^{2+}_aM3^{1+}_b \quad \text{(Formula 10)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}_2M2^{3+}_vSi_{(1-v)}O_4:RE1^{3+}_{(z-a-b)}RE2^{2+}_aM3^{1+}_b \quad \text{(Formula 11)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}M2^{3+}_{2v}Si_{(2-2v)}O_5:RE1^{3+}_{(z-a-b)}RE2^{2+}_aM3^{1+}_b \quad \text{(Formula 12)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}_3M2^{3+}_{2v}Si_{(2-2v)}O_7:RE1^{3+}_{(z-a-b)}RE2^{2+}_aM3^{1+}_b \quad \text{(Formula 13)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}_2M2^{3+}_{3v}Si_{(3-3v)}O_5:RE1^{3+}_{(z-a-b)}RE2^{2+}_aM3^{1+}_b \quad \text{(Formula 14)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}_5M2^{3+}_{8v}Si_{(8-8v)}O_{21}:RE1^{3+}_{(z-a-b)}RE2^{2+}_aM3^{1+}_b \quad \text{(Formula 15)}$$

wherein:
M1$^{2+}$ is a divalent metal element;
M2$^{3+}$ is a trivalent metal element;
M3$^{1+}$ is a monovalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{1+}_2M2^{2+}M3^{3+}_vSi_{(1-v)}O_4:RE1^{3+}_{(z-a-b)}RE2^{4+}_aM4^{2+}_b \quad \text{(Formula 16)}$$

wherein:
M1$^{1+}$ is a monovalent metal element;
each of M2$^{2+}$ and M4$^{2+}$ is a divalent metal element;
M3$^{3+}$ is a trivalent metal element;
RE1$^{3+}$ is a trivalent rare earth element;
RE2$^{4+}$ is a tetravalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{1+}_2M2^{2+}M3^{3+}_vSi_{(1-v)}O_4:RE1^{3+}_{(z-a-b)}RE2^{2+}_aM4^{4+}_b \quad \text{(Formula 17)}$$

wherein:
M1$^{1+}$ is a monovalent metal element;
M2$^{2+}$ is a divalent metal element;
M3$^{3+}$ is a trivalent metal element;
M4$^{4+}$ is a tetravalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{1+}M2^{3+}_{(1+v-z)}Si_{(1-v)}O_4:RE1^{3+}_{(z-a-b)}RE2^{4+}_aM3^{2+}_b \quad \text{(Formula 18)}$$

wherein:
M1$^{1+}$ is a monovalent metal element;
M2$^{3+}$ is a trivalent metal element;
M3$^{4+}$ is a divalent metal element;
RE1$^{3+}$ is a trivalent rare earth element;
RE2$^{4+}$ is a tetravalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{1+}M2^{3+}{}_{(1+v-z)}Si_{(1-v)}O_4:RE1^{3+}{}_{(z-a-b)}RE2^{2+}{}_aM3^{4+}{}_b \quad \text{(Formula 19)}$$

wherein:
M1$^{1+}$ is a monovalent metal element;
M2$^{3+}$ is a trivalent metal element;
M3$^{4+}$ is a tetravalent metal element;
RE1$^{3+}$ is a trivalent rare earth element;
RE2$^{2+}$ is a divalent rare earth element;
each of a, b, v, and z is greater than or equal to 0 and less than or equal to 0.01;
z is greater than or equal to 0.0001 and less than or equal to 0.01; and
(a+b) is greater than or equal to 0.0001 and less than 0.01.

Exemplary compounds include $Ba_2MgSi_2O_7$, $Ba_2Si_3O_8$, $Ba_2SiO$, $Ba_2ZnSi_2O_7$, $Ba_5SisO_{21}$, $BaSi_2O_5$, $BaSiO_3$, $Gd_2Si_2O_7$, $Li_2CaSiO_4$, $Lu_{(2-2x)}Gd_{(2x)}SiO_5$, $Lu_{(2-2x)}Y_{2x}SiO_5$, $Lu_2Si_2O_7$, $MgSr_2Si_2O_7$, $NaLaSiO_4$, $Y_2SiO_5$, and the like, wherein x can range from 0 to 1. Each of the foregoing compounds may include a rare earth dopant that is not provided with the chemical formula.

In another embodiment, the scintillation compound can be a metal halide. The metal halide can be a Group 2 halide, or a rare earth halide. The scintillation compound can be a mixed metal halide, wherein the mixed metal halide includes a combination of metals as principal constituents. In an embodiment, the mixed metal halide can include a Group 1-rare earth metal halide, a Group 2-rare earth metal halide. In another example, a mixed halogen metal halide can include a Group 2-$X_1$-$X_2$ metal halide, wherein $X_1$ and $X_2$ are different halogen (for example, BaBrI).

Below are non-limiting, exemplary formulas for families of compounds.

$$M1^{2+}{}_{(1-x-y)}RE3^{+}{}_xM2^{1+}{}_yX_2 \quad \text{(Formula 20)}$$

wherein:
M1$^{2+}$ is an divalent metal element;
M2$^{1+}$ is a monovalent metal element;
RE$^{3+}$ is a trivalent rare earth element;
X is a halogen;
each of x and y is greater than or equal to 0 and less than or equal to 0.2; and
(x+y) is greater than or equal to 0.0001 and less than 0.2.

$$RE1^{3+}{}_{(1-a-b)}RE2^{4+}{}_aM^{2+}{}_bX_3 \quad \text{(Formula 21)}$$

wherein:
M$^{2+}$ is a divalent metal element;
RE1$^{3+}$ is a trivalent rare earth element;
RE2$^{4+}$ is a tetravalent rare earth element;
X is a halogen;
each of a and b is greater than or equal to 0 and less than or equal to 0.2; and
(a+b) are greater than or equal to 0.0001 and less than 0.2.

$$RE1^{3+}{}_{(1-a-b)}RE2^{2+}{}_aM^{4+}{}_bX_3 \quad \text{(Formula 22)}$$

wherein:
M$^{4+}$ is a tetravalent metal element;
RE1$^{3+}$ is a trivalent rare earth element;
RE2$^{2+}$ is a divalent rare earth element;
X is a halogen;
each of a and b is greater than or equal to 0 and less than or equal to 0.2; and
(a+b) are greater than or equal to 0.0001 and less than 0.2.

$$M^{1+}X:RE1^{3+}{}_{(z-a-b)}RE2^{4+}{}_aM2^{2+}{}_b \quad \text{(Formula 23)}$$

wherein:
M1$^{1+}$ is a monovalent metal element;
M2$^{2+}$ is a divalent metal element;
RE1$^{3+}$ is a trivalent rare earth element;
RE2$^{4+}$ is a tetravalent rare earth element;
X is a halogen;
each of a, b, and z is greater than or equal to 0 and less than or equal to 0.01;
z is greater than or equal to 0.0001 and less than or equal to 0.01; and
(a+b) is greater than or equal to 0.0001 and less than 0.01.

$$M^{1+}X:RE1^{3+}{}_{(z-a-b)}RE2^{2+}{}_aM2^{4+}{}_b \quad \text{(Formula 24)}$$

wherein:
M1$^{1+}$ is a monovalent metal element;
M2$^{4+}$ is a tetravalent metal element;
RE1$^{3+}$ is a trivalent rare earth element;
RE2$^{2+}$ is a divalent rare earth element;
X is a halogen;
each of a, b, and z is greater than or equal to 0 and less than or equal to 0.01;
z is greater than or equal to 0.0001 and less than or equal to 0.01; and
(a+b) is greater than or equal to 0.0001 and less than 0.01.

$$M1^{2+}{}_{(1-x-y)}RE1^{3+}{}_xM2^{1+}{}_yRE2^{3+}{}_{(1-a-b)}RE3^{4+}{}_aM3^{2+}{}_bX_5 \quad \text{(Formula 25)}$$

wherein:
each of M1$^{2+}$ and M3$^{2+}$ is a divalent metal element;
M2$^{1+}$ is a monovalent metal element;
RE1$^{3+}$ is a trivalent rare earth element;
RE2$^{3+}$ is a trivalent rare earth element;
RE2$^{4+}$ is a tetravalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{1+}{}_3RE1^{3+}{}_{(1-a-b)}RE2^{4+}{}_aM2^{2+}{}_bX_6 \quad \text{(Formula 26)}$$

wherein:
M1$^{1+}$ is a monovalent metal element;
M2$^{2+}$ is a divalent metal atom;
RE1$^{3+}$ is a trivalent rare earth element;
RE2$^{4+}$ is a tetravalent rare earth element;
X is a halogen;
each of a and b are greater than or equal to 0 and less than or equal to 0.2; and
(a+b) are greater than or equal to 0.0001 and less than 0.2.

$$M1^{1+}{}_3RE1^{3+}{}_{(1-a-b)}RE2^{2+}{}_aM2^{4+}{}_bX_6 \quad \text{(Formula 27)}$$

wherein:
M1$^{1+}$ is a monovalent metal element;
M2$^{4+}$ is a tetravalent metal element;
RE1$^{3+}$ is a trivalent rare earth element;
RE2$^{2+}$ is a divalent rare earth element;
X is a halogen;
each of a and b are greater than or equal to 0 and less than or equal to 0.2; and (a+b) are greater than or equal to 0.0001 and less than 0.2.

$$M1^{1+}M2^{2+}{}_{(1-x-y)}RE1^{3+}{}_xM3^{1+}{}_yRE2^{3+}{}_{(1-a-b)}RE3^{4+}{}_a M4^{2+}{}_bX_7 \quad \text{(Formula 28)}$$

wherein:
each of $M1^{1+}$ and $M3^{1+}$ is a monovalent metal element;
each of $M3^{2+}$ and $M4^{2+}$ is a divalent metal element;
$RE1^{3+}$ is a trivalent rare earth element;
$RE2^{3+}$ is a trivalent rare earth element;
$RE2^{4+}$ is a tetravalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{1+}M2^{2+}{}_{(1-x-y)}RE1^{3+}{}_xM3^{1+}{}_yRE2^{3+}{}_{(1-a-b)}RE3^{2+}{}_a M4^{4+}{}_bX_7 \quad \text{(Formula 29)}$$

wherein:
each of $M1^{1+}$ and $M3^{1+}$ is a monovalent metal element;
$M3^{2+}$ is a divalent metal element;
$M4^{4+}$ is a tetravalent metal element;
$RE1^{3+}$ is a trivalent rare earth element;
$RE2^{3+}$ is a trivalent rare earth element;
$RE3^{2+}$ is a divalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{2+}{}_{(2-2x-2y)}RE1^{3+}{}_{2x}M2^{1+}{}_{2y}RE2^{3+}{}_{(1-a-b)}RE3^{4+}{}_a M3^{2+}{}_bX_7 \quad \text{(Formula 30)}$$

wherein:
each of $M1^{2+}$ and $M3^{2+}$ is a divalent metal element;
$M2^{1+}$ is a monovalent metal element;
$RE1^{3+}$ is a trivalent rare earth element;
$RE2^{3+}$ is a trivalent rare earth element;
$RE2^{4+}$ is a tetravalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{2+}{}_{(2-2x-2y)}RE1^{3+}{}_{2x}M2^{1+}{}_{2y}RE2^{3+}{}_{(1-a-b)}RE3^{2+}{}_a M3^{4+}{}_bX_7 \quad \text{(Formula 31)}$$

wherein:
$M1^{2+}$ is a divalent metal element;
$M2^{1+}$ is a monovalent metal element;
$M3^{4+}$ is a tetravalent metal element;
$RE1^{3+}$ is a trivalent rare earth element;
$RE2^{3+}$ is a trivalent rare earth element;
$RE3^{2+}$ is a divalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{1+}{}_{(3-3x-3y)}RE1^{3+}{}_{3x}M2^{1+}{}_{3y}RE2^{3+}{}_{(2-2a-2b)}RE3^{4+}{}_{2a}M3^{2+}{}_{2b}X_9 \quad \text{(Formula 32)}$$

wherein:
each of $M1^{1+}$ and $M2^{1+}$ is a monovalent metal element;
$M2^{2+}$ is a divalent metal element;
$RE1^{3+}$ is a trivalent rare earth element;
$RE2^{3+}$ is a trivalent rare earth element;
$RE3^{4+}$ is a tetravalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

$$M1^{1+}{}_{(3-3x-3y)}RE1^{3+}{}_{3x}M2^{1+}{}_{3y}RE2^{3+}{}_{(2-2a-2b)}RE3^{2+}{}_{2a}M3^{4+}{}_{2b}X_9 \quad \text{(Formula 33)}$$

wherein:
each of $M1^{1+}$ and $M2^{1+}$ is a monovalent metal element;
$M3^{4+}$ is a tetravalent metal element;
$RE1^{3+}$ is a trivalent rare earth element;
$RE2^{3+}$ is a trivalent rare earth element;
$RE3^{2+}$ is a divalent rare earth element;
X is a halogen;
each of a, b, x, and y are greater than or equal to 0 and less than or equal to 0.2; and
either or both of (x+y) and (a+b) are greater than or equal to 0.0001 and less than 0.2.

Exemplary compounds that can be modified in accordance with the above-referenced formulas include $Ba_2GdCl_7$, $Ba_2YCl_7$, $BaBr_2$, $BaBrI$, $BaCl_2$, $BaF_2$, $BaGdCl_5$, $BaI_2$, $BaY_2F_8$, $BiF_3$, $CaF_2$, $CaI_2$, $Cs_2LiCeCl_6$, $Cs_2LiLuCl_6$, $Cs_2LiYBr_6$, $Cs_2LiYCl_6$, $Cs_2NaLaBr_6$, $Cs_2NaLuBr_6$, $Cs_2NaYBr_6$, $Cs_3CeCl_6$, $Cs_3Gd_2I_9$, $Cs_3LaBr_6$, $Cs_3Lu_2I_9$, $Cs_3LuI_6$, $CsBa_2I_5$, $CsCe_2Cl_7$, $CsGd_2F_7$, $CsI$, $CsY_2F_7$, $GdBr_3$, $GdCl_3$, $K_2CeBr_5$, $K_2LaCl_5$, $K_2YF_5$, $KLu_2F_7$, $KLuF_4$, $KYF_4$, $La_{(1-x)}Ce_xBr_3$, $LaCeF_6$, $La_{(1-x)}Ce_xCl_3$, $LaF_3$, $LaI3$, $Li_3YCl_6$, $LiI$, $Lu_{(1-x)}GdxI_3$, $Lu_{(1-x)}Y_xI_3$, $LuBr_3$, $LuCl_3$, $LuI_3$, $PbCl_2$, $PrBr_3$, $PrF_3$, $Rb_2CeBr_5$, $LiCaAlF_6$, $Rb_2LiYBr_6$, $RbGd_2Br_7$, $SrBr_2$, $SrF_2$, $SrI_2$, $YCl_3$, or the like, wherein x can range from 0 to 1. Each of the foregoing compounds may include a rare earth dopant that is not provided with the chemical formula.

In still another embodiment, the scintillation compound can be a metal oxide. The scintillation compound can be a single metal oxide, such as a trivalent metal oxide, or a mixed metal oxide, wherein the metal oxide includes a combination of metals as principal constituents. For example, the mixed metal oxide can be a divalent metal-tetravalent metal oxide, a rare earth aluminate, or a rare earth-divalent metal aluminum garnet.

Below are non-limiting, exemplary formulas for families of compounds.

$$M1^{3+}{}_{(2-2x-2y)}RE^{4+}{}_{2x}M2^{2+}{}_{2y}O_3 \quad \text{(Formula 34)}$$

wherein:
$M1^{3+}$ is a trivalent metal element, which may or may not include a trivalent rare earth element;
$M2^{2+}$ is a divalent metal element;
$RE^{4+}$ is a tetravalent rare earth element;
each of x and y are greater than or equal to 0 and less than or equal to 0.2; and
(x+y) is greater than or equal to 0.0001 and less than 0.2.

$$M1^{3+}{}_{(2-2x-2y)}RE^{2+}{}_{2x}M2^{4+}{}_{2y}O_3 \quad \text{(Formula 35)}$$

wherein:
$M1^{3+}$ is a trivalent metal element, which may or may not include a trivalent rare earth element;
$M2^{4+}$ is a tetravalent metal element;
$RE^{2+}$ is a divalent rare earth element;
each of x and y are greater than or equal to 0 and less than or equal to 0.2; and
(x+y) is greater than or equal to 0.0001 and less than 0.2.

$$M1^{3+}{}_{(8-8x-8y)}RE^{4+}{}_{8x}M2^{2+}{}_{8y}O_{12} \quad \text{(Formula 36)}$$

wherein:
$M1^{3+}$ is a trivalent metal element, which may or may not include a trivalent rare earth element;

$M2^{2+}$ is a divalent metal element;
RE$^{4+}$ is a tetravalent rare earth element;
each of x and y are greater than or equal to 0 and less than or equal to 0.2; and
(x+y) is greater than or equal to 0.0001 and less than 0.2.

$$M1^{3+}{}_{(8-8x-8y)}RE^{2+}{}_{8x}M2^{4+}{}_{8y}O_{12} \quad \text{(Formula 37)}$$

wherein:
M1$^{3+}$ is a trivalent metal element, which may or may not include a trivalent rare earth element;
M2$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

$$M1^{2+}{}_{(1-x-y)}RE^{3+}{}_xM2^{1+}{}_yM3^{4+}O_3 \quad \text{(Formula 38)}$$

wherein:
M1$^{2+}$ is a divalent metal element;
M2$^{1+}$ is a monovalent metal element;
M3$^{4+}$ is a tetravalent metal element;
RE$^{3+}$ is a trivalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}M2^{3+}{}_{(12-12x-12y)}RE^{4+}{}_{12a}M3^{2+}{}_{12b}O_{19} \quad \text{(Formula 39)}$$

wherein:
each of M1$^{2+}$ and M3$^{2+}$ is a divalent metal element;
M2$^{3+}$ is a trivalent metal element, which may or may not include a trivalent rare earth element;
RE$^{4+}$ is a tetravalent rare earth element;
x and y are greater than or equal to 0 and less than or equal to 0.2; and
(x+y) is greater than or equal to 0.0001 and less than 0.2.

$$M1^{2+}M2^{3+}{}_{(12-12x-12y)}RE^{2+}{}_{12x}M3^{4+}{}_{12y}O_{19} \quad \text{(Formula 40)}$$

wherein:
M1$^{2+}$ is a divalent metal element;
M2$^{3+}$ is a trivalent metal element, which may or may not include a trivalent rare earth element;
M3$^{4+}$ is a tetravalent metal element;
RE$^{2+}$ is a divalent rare earth element;
x and y are greater than or equal to 0 and less than or equal to 0.2; and
(x+y) is greater than or equal to 0.0001 and less than 0.2.

$$M1^{2+}{}_{(2-2x-2y)}RE1^{3+}{}_xM2^{1+}{}_yM3^{3+}{}_{(10-10a-10b)}RE2^{4+}{}_{10a}M4^{2+}{}_{10b}O_{17} \quad \text{(Formula 41)}$$

wherein:
each of M1$^{2+}$ and M4$^{2+}$ is a divalent metal element;
M2$^{1+}$ is a monovalent metal element;
M3$^{3+}$ is a trivalent metal element, which may or may not include a trivalent rare earth element;
RE1$^{3+}$ is a trivalent rare earth element;
RE2$^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}{}_{(2-2x-2y)}RE1^{3+}{}_xM2^{1+}{}_yM3^{3+}{}_{(10-10a-10b)}RE2^{2+}{}_{10a}M4^{4+}{}_{10b}O_{17} \quad \text{(Formula 42)}$$

wherein:
M1$^{2+}$ is a divalent metal element;
M2$^{1+}$ is a monovalent metal element;
M3$^{3+}$ is a trivalent metal element, which may or may not include a trivalent rare earth element;
M4$^{4+}$ is a tetravalent metal element;
RE1$^{3+}$ is a trivalent rare earth element;
RE2$^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

Exemplary compounds that can be modified in accordance with the above-referenced formulas include BaAl$_{10}$MgO$_{17}$, BaAl$_{12}$O$_{19}$, BaHfO$_3$, CaHfO$_3$, Gd$_2$O$_3$, Gd$_{(3-3x)}$Y$_{3x}$Al$_5$O$_{12}$, Gd$_3$Sc$_2$Al$_3$O$_{12}$, Gd$_3$Y$_3$Al$_{10}$O$_{24}$, GdAlO$_3$, La$_2$O$_3$, LaAlO$_3$, Lu$_2$O$_3$, Lu$_3$Al$_5$O$_{12}$, Lu$_3$Al$_5$O$_{12}$, LuAlO$_3$, SrHfO$_3$, Y$_2$O$_3$, YAlO$_3$, or the like, wherein x can range from 0 to 1. Each of the foregoing compounds may include a rare earth dopant that is not provided with the chemical formula.

In yet another embodiment, the scintillation compound can be a metal-boron-oxygen compound. The metal-boron-oxygen compound can be a single metal borate or oxyborate or a mixed metal borate or oxyborate, wherein the metal borate or oxyborate includes a combination of metals as principal constituents. In an embodiment, the metal-boron-oxygen compound can be a Group 1-rare earth metal borate, Group 2 metal borate, a Group 2-rare earth metal borate, a Group 2-rare earth metal oxyborate, or a Group 2 metal borooxyhalide.

Below are non-limiting, exemplary formulas for families of compounds.

$$M1^{2+}{}_{(3-3x-3y)}RE^{3+}{}_{3x}M2^{1+}{}_{3y}(BO_3)_3 \quad \text{(Formula 43)}$$

wherein:
M1$^{2+}$ is a divalent metal element;
M2$^{1+}$ is a monovalent metal element;
RE$^{3+}$ is a trivalent rare earth element;
each of x and y are greater than or equal to 0 and less than or equal to 0.2; and
(x+y) is greater than or equal to 0.0001 and less than 0.2.

$$M1^{3+}{}_{(1-x-y)}RE^{4+}{}_xM2^{2+}{}_y(BO_3)_3 \quad \text{(Formula 44)}$$

wherein:
M1$^{3+}$ is a trivalent metal element, which may or may not include a trivalent rare earth element;
M2$^{2+}$ is a divalent metal element;
RE$^{4+}$ is a tetravalent rare earth element;
each of x and y are greater than or equal to 0 and less than or equal to 0.2; and
(x+y) is greater than or equal to 0.0001 and less than 0.2.

$$M1^{3+}{}_{(1-x-y)}RE^{2+}{}_xM2^{4+}{}_y(BO_3)_3 \quad \text{(Formula 45)}$$

wherein:
M1$^{3+}$ is a trivalent metal element, which may or may not include a trivalent rare earth element;
M2$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

$$M1^{3+}{}_{(1-x-y)}RE^{4+}{}_xM2^{2+}{}_yB_3O_6 \quad \text{(Formula 46)}$$

wherein:
M1$^{3+}$ is a trivalent metal element, which may or may not include a trivalent rare earth element;
M2$^{2+}$ is a divalent metal element;
RE$^{4+}$ is a tetravalent rare earth element;
each of x and y are greater than or equal to 0 and less than or equal to 0.2; and (x+y) is greater than or equal to 0.0001 and less than 0.2.

 (Formula 47)

wherein:
M1$^{3+}$ is a trivalent metal element, which may or may not include a trivalent rare earth element;
M2$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

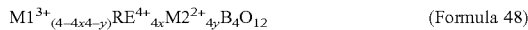 (Formula 48)

wherein:
M1$^{3+}$ is a trivalent metal element, which may or may not include a trivalent rare earth element;
M2$^{2+}$ is a divalent metal element;
RE$^{4+}$ is a tetravalent rare earth element;
each of x and y are greater than or equal to 0 and less than or equal to 0.2; and
(x+y) is greater than or equal to 0.0001 and less than 0.2.

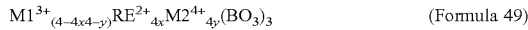 (Formula 49)

wherein:
M1$^{3+}$ is a trivalent metal element, which may or may not include a trivalent rare earth element;
M2$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

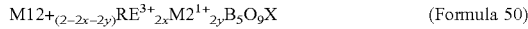 (Formula 50)

wherein:
M1$^{2+}$ is a divalent metal element;
M2$^{1+}$ is a monovalent metal element;
RE$^{3+}$ is a trivalent rare earth element;
X is a halogen;
each of x and y are greater than or equal to 0 and less than or equal to 0.2; and
(x+y) is greater than or equal to 0.0001 and less than 0.2.

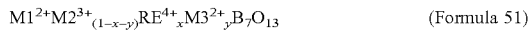 (Formula 51)

wherein:
M1$^{2+}$ is a divalent metal element;
M2$^{3+}$ is a trivalent metal element, which may or may not include a trivalent rare earth element;
M3$^{2+}$ is a divalent metal element;
RE$^{4+}$ is a tetravalent rare earth element;
each of x and y are greater than or equal to 0 and less than or equal to 0.2; and
(x+y) is greater than or equal to 0.0001 and less than 0.2.

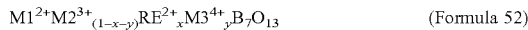 (Formula 52)

wherein:
M1$^{2+}$ is a divalent metal element;
M2$^{3+}$ is a trivalent metal element, which may or may not include a trivalent rare earth element;
M3$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

 (Formula 53)

wherein:
M1$^{1+}$ is a monovalent metal element;
M2$^{3+}$ is a trivalent metal element, which may or may not include a trivalent rare earth element;
M3$^{2+}$ is a divalent metal element;
RE$^{4+}$ is a tetravalent rare earth element;
each of x and y are greater than or equal to 0 and less than or equal to 0.2; and
(x+y) is greater than or equal to 0.0001 and less than 0.2.

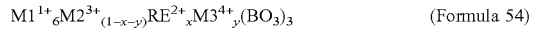 (Formula 54)

wherein:
M1$^{1+}$ is a monovalent metal element;
M2$^{3+}$ is a trivalent metal element, which may or may not include a trivalent rare earth element;
M3$^{4+}$ is a tetravalent metal element;
RE$^{2+}$ is a divalent rare earth element;
each of x and y are greater than or equal to 0 and less than or equal to 0.2; and
(x+y) is greater than or equal to 0.0001 and less than 0.2.

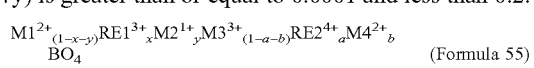 (Formula 55)

wherein:
each of M1$^{2+}$ and M4$^{2+}$ is a divalent metal element;
M2$^{1+}$ is a monovalent metal element;
M3$^{3+}$ is a trivalent metal element, which may or may not include a trivalent rare earth element;
RE1$^{3+}$ is a trivalent rare earth element;
RE2$^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

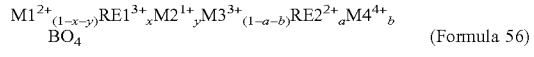 (Formula 56)

wherein:
M1$^{2+}$ is a divalent metal element;
M2$^{1+}$ is a monovalent metal element;
M3$^{3+}$ is a trivalent metal element, which may or may not include a trivalent rare earth element;
M4$^{2+}$ is a tetravalent metal element;
RE1$^{3+}$ is a trivalent rare earth element;
RE2$^{2+}$ is a divalent rare earth element;
each of a, b, x, and y are greater than or equal to 0 and less than or equal to 0.2; and
either or both of (x+y) and (a+b) are greater than or equal to 0.0001 and less than 0.2.

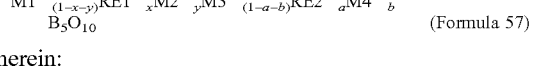 (Formula 57)

wherein:
each of M1$^{2+}$ and M4$^{2+}$ is a divalent metal element;
M2$^{1+}$ is a monovalent metal element;
M3$^{3+}$ is a trivalent metal element, which may or may not include a trivalent rare earth element;
RE1$^{3+}$ is a trivalent rare earth element;
RE2$^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

 (Formula 58)

wherein:
M1$^{2+}$ is a divalent metal element;
M2$^{1+}$ is a monovalent metal element;

$M3^{3+}$ is a trivalent metal element, which may or may not include a trivalent rare earth element;
$M4^{4+}$ is a tetravalent metal element;
$RE1^{3+}$ is a trivalent rare earth element;
$RE2^{2+}$ is a divalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}_{(3-3x-3y)}RE1^{3+}_{3x}M2^{1+}_{3y}M3^{3+}_{(1-a-b)}RE2^{4+}_{a}M4^{2+}_{b}(BO_3)_3 \quad \text{(Formula 59)}$$

wherein:
each of $M1^{2+}$ and $M4^{2+}$ is a divalent metal element;
$M2^{1+}$ is a monovalent metal element;
$M3^{3+}$ is a trivalent metal element, which may or may not include a trivalent rare earth element;
$RE1^{3+}$ is a trivalent rare earth element;
$RE2^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}_{(3-3x-3y)}RE1^{3+}_{3x}M2^{1+}_{3y}M3^{3+}_{(1-a-b)}RE2^{2+}_{a}M4^{4+}_{b}(BO_3)_3 \quad \text{(Formula 60)}$$

wherein:
$M1^{2+}$ is a divalent metal element;
$M2^{1+}$ is a monovalent metal element;
$M3^{3+}$ is a trivalent metal element, which may or may not include a trivalent rare earth element;
$M4^{4+}$ is a tetravalent metal element;
$RE1^{3+}$ is a trivalent rare earth element;
$RE2^{2+}$ is a divalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}_{(4-4x-4y)}RE1^{3+}_{4x}M2^{1+}_{4y}M3^{3+}_{(1-a-b)}RE2^{4+}_{a}M4^{2+}_{b}(BO_3)_3 \quad \text{(Formula 61)}$$

wherein:
each of $M1^{2+}$ and $M4^{2+}$ is a divalent metal element;
$M2^{1+}$ is a monovalent metal element;
$M3^{3+}$ is a trivalent metal element, which may or may not include a trivalent rare earth element;
$RE1^{3+}$ is a trivalent rare earth element;
$RE2^{4+}$ is a tetravalent rare earth element;
each of a, b, x, and y are greater than or equal to 0 and less than or equal to 0.2; and
either or both of (x+y) and (a+b) are greater than or equal to 0.0001 and less than 0.2.

$$M1^{2+}_{(4-4x-4y)}RE1^{3+}_{4x}M2^{1+}_{4y}M3^{3+}_{(1-a-b)}RE2^{2+}_{a}M4^{4+}_{b}(BO_3)_3 \quad \text{(Formula 62)}$$

wherein:
$M1^{2+}$ is a divalent metal element;
$M2^{1+}$ is a monovalent metal element;
$M3^{3+}$ is a trivalent metal element, which may or may not include a trivalent rare earth element;
$M4^{4+}$ is a tetravalent metal element;
$RE1^{3+}$ is a trivalent rare earth element;
$RE2^{2+}$ is a divalent rare earth element;
each of a, b, x, and y are greater than or equal to 0 and less than or equal to 0.2; and
either or both of (x+y) and (a+b) are greater than or equal to 0.0001 and less than 0.2.

Exemplary compounds that can be modified in accordance with the above-referenced formulas include $Ba_2B_5O_9Cl$, $Ba_2Ca(BO_3)_2$, $Ba_3Gd(BO_3)_3$, $Ca_4YO(BO_3)_3$, $CaLaB_7O_{13}$, $CaYBO_4$, $GdB_3O_6$, $GdBO_3$, $LaB_3O_6$, $LaBO_3$, $LaMgB_5O_{10}$, $Li_6Gd(BO_3)_3$, $Li_6Y(BO_3)_3$, $LuBO_3$, $ScBO_3$, $YAl_3B_4O_{12}$, $YBO_3$, or the like. Each of the foregoing compounds may include a rare earth dopant that is not provided with the chemical formula.

In a further embodiment, the scintillation compound can be a metal-phosphorus-oxygen compound. The metal-phosphorus-oxygen compound can be a metal phosphite or a metal phosphate. The metal metal-phosphorus-oxygen can be a single metal phosphite or phosphate or a mixed metal phosphite or phosphate, wherein the metal phosphite or phosphate includes a combination of metals as principal constituents. In an embodiment, the metal-phosphorous compound can include as a monovalent metal-rare earth metal phosphite, a Group 2-rare earth metal phosphite, a Group 2 metal phosphate, or a Group 2 metal phosphate halide.

Below are non-limiting, exemplary formulas for families of compounds.

$$M1^{2+}_{(1-x-y)}RE^{3+}_{x}M2^{1+}_{y}P_2O_6 \quad \text{(Formula 63)}$$

wherein:
$M1^{2+}$ is a divalent metal element;
$M2^{1+}$ is a monovalent metal element;
$RE^{3+}$ is a trivalent rare earth element;
x and y are greater than or equal to 0 and less than or equal to 0.2; and
(x+y) is greater than or equal to 0.0001 and less than 0.2.

$$M1^{2+}_{(2-2x-2y)}RE^{3+}_{2x}M2^{1+}_{2y}P_2O_7 \quad \text{(Formula 64)}$$

wherein:
$M1^{2+}$ is a divalent metal element;
$M2^{1+}$ is a monovalent metal element;
$RE^{3+}$ is a trivalent rare earth element;
x and y are greater than or equal to 0 and less than or equal to 0.2; and
(x+y) is greater than or equal to 0.0001 and less than 0.2.

$$M1^{2+}_{(3-3x-3y)}RE^{3+}_{2x}M2^{1+}_{2y}P_4O_{13} \quad \text{(Formula 65)}$$

wherein:
$M1^{2+}$ is a divalent metal element;
$M2^{1+}$ is a monovalent metal element;
$RE^{3+}$ is a trivalent rare earth element;
x and y are greater than or equal to 0 and less than or equal to 0.2; and
(x+y) is greater than or equal to 0.0001 and less than 0.2.

$$M1^{2+}_{(3-3x-3y)}RE^{3+}_{3x}M2^{1+}_{3y}(PO_4)_2 \quad \text{(Formula 66)}$$

wherein:
$M1^{2+}$ is a divalent metal element;
$M2^{1+}$ is a monovalent metal element;
$RE^{3+}$ is a trivalent rare earth element;
x and y are greater than or equal to 0 and less than or equal to 0.2; and
(x+y) is greater than or equal to 0.0001 and less than 0.2.

$$M1^{2+}_{(5-5x-5y)}RE^{3+}_{5x}M2^{1+}_{5y}(PO_4)_3X \quad \text{(Formula 67)}$$

wherein:
$M1^{2+}$ is a divalent metal element;
$M2^{1+}$ is a monovalent metal element;
$RE^{3+}$ is a trivalent rare earth element;
X is a halogen;
x and y are greater than or equal to 0 and less than or equal to 0.2; and
(x+y) is greater than or equal to 0.0001 and less than 0.2.

$$5M1^{2+}_{(1-x-y)}RE^{3+}_{x}M2^{1+}_{y}BPO_5 \quad \text{(Formula 68)}$$

wherein:
M1$^{2+}$ is a divalent metal element;
M2$^{1+}$ is a monovalent metal element;
RE$^{3+}$ is a trivalent rare earth element;
x and y are greater than or equal to 0 and less than or equal to 0.2; and
(x+y) is greater than or equal to 0.0001 and less than 0.2.

$$M1^{2+}{}_{(3-3x-3y)}RE^{3+}{}_{3x}M2^{1+}{}_{3y}B(PO_4)_3 \quad \text{(Formula 69)}$$

wherein:
M1$^{2+}$ is a divalent metal element;
M2$^{1+}$ is a monovalent metal element;
RE$^{3+}$ is a trivalent rare earth element;
x and y are greater than or equal to 0 and less than or equal to 0.2; and
(x+y) is greater than or equal to 0.0001 and less than 0.2.

$$M1^{1+}M2^{2+}{}_{(1-x-y)}RE^{3+}{}_xM3^{1+}{}_yPO_4 \quad \text{(Formula 70)}$$

wherein:
each of M1$^{2+}$ and M3$^{1+}$ is a monovalent metal element;
M2$^{2+}$ is a divalent metal element;
RE$^{3+}$ is a trivalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{4+}{}_xM^{2+}{}_yPO_4 \quad \text{(Formula 71)}$$

wherein:
M$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{2+}{}_xM^{4+}{}_yPO_4 \quad \text{(Formula 72)}$$

wherein:
M$^{4+}$ is a tetravalent metal element;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{4+}{}_xM^{2+}{}_yP_2O_7 \quad \text{(Formula 73)}$$

wherein:
M$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{2+}{}_xM^{4+}{}_yP_2O_7 \quad \text{(Formula 74)}$$

wherein:
M$^{4+}$ is a tetravalent metal element;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{4+}{}_xM^{2+}{}_yP_5O_{14} \quad \text{(Formula 75)}$$

wherein:
M$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$RE1^{3+}{}_{(1-x-y)}RE2^{2+}{}_xM^{4+}{}_yP_5O_{14} \quad \text{(Formula 76)}$$

wherein:
M$^{4+}$ is a tetravalent metal element;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$M1^{1+}RE1^{3+}{}_{(1-x-y)}RE2^{4+}{}_xM2^{2+}{}_yP_2O_7 \quad \text{(Formula 77)}$$

wherein:
M1$^{1+}$ is a monovalent metal element;
M2$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$M1^{1+}RE1^{3+}{}_{(1-x-y)}RE2^{2+}{}_xM2^{4+}{}_yP_2O_7 \quad \text{(Formula 78)}$$

wherein:
M1$^{1+}$ is a monovalent metal element;
M2$^{4+}$ is a tetravalent metal element;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$M1^{1+}RE1^{3+}{}_{(1-x-y)}RE2^{4+}{}_xM2^{2+}{}_y(PO_3)_4 \quad \text{(Formula 79)}$$

wherein:
M1$^{1+}$ is a monovalent metal element;
M2$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$M1^{1+}RE1^{3+}{}_{(1-x-y)}RE2^{2+}{}_xM2^{4+}{}_y(PO_3)_4 \quad \text{(Formula 80)}$$

wherein:
M1$^{1+}$ is a monovalent metal element;
M2$^{4+}$ is a tetravalent metal element;
RE1$^{3+}$ is a trivalent rare earth element;
RE2$^{2+}$ is a divalent rare earth element;
x and y are greater than or equal to 0 and less than or equal to 0.2; and
(x+y) is greater than or equal to 0.0001 and less than 0.2.

$$M1^{1+}{}_3RE1^{3+}{}_{(1-x-y)}RE2^{4+}{}_xM2^{2+}{}_y(PO_4)_2 \quad \text{(Formula 81)}$$

wherein:
M1$^{1+}$ is a monovalent metal element;
M2$^{2+}$ is a divalent metal element;
RE1$^{3+}$ is a trivalent rare earth element;
RE2$^{4+}$ is a tetravalent rare earth element;
x and y are greater than or equal to 0 and less than or equal to 0.2; and
(x+y) is greater than or equal to 0.0001 and less than 0.2.

$$M1^{1+}{}_3RE1^{3+}{}_{(1-x-y)}RE2^{2+}{}_xM2^{4+}{}_y(PO_4)_2 \quad \text{(Formula 82)}$$

wherein:
M1$^{1+}$ is a monovalent metal element;
M2$^{4+}$ is a tetravalent metal element;
RE1$^{3+}$ is a trivalent rare earth element;

RE2$^{2+}$ is a divalent rare earth element;
x and y are greater than or equal to 0 and less than or equal to 0.2; and
(x+y) is greater than or equal to 0.0001 and less than 0.2.

Exemplary compounds that can be modified in accordance with the above-referenced formulas include AgGd(PO$_3$)$_4$, Ba$_2$P$_2$O$_7$, Ba$_3$(PO$_4$)$_2$, Ba$_3$B(PO$_4$)$_3$, Ba$_3$P$_4$O$_{13}$, Ba$_5$(PO$_4$)$_3$F, BaKPO$_4$, BaP$_2$O$_6$, Ca$_5$(PO$_4$)$_3$F, CaBPO$_5$, CeP$_5$O$_{14}$, CsGd(PO$_3$)$_4$, CsLuP$_2$O$_7$, CsYP$_2$O$_7$, K$_3$Lu(PO$_4$)$_2$, KGd(PO$_3$)$_4$, LuP$_2$O$_7$, KYP$_2$O$_7$, LiCaPO$_4$, LiGd(PO$_3$)$_4$, LuPO$_4$, NaBaPO$_4$, NaGd(PO$_3$)$_4$, NaLuP$_2$O$_7$, RbLuP$_2$O$_7$, RbYP$_2$O$_7$, Sr$_5$(PO$_4$)$_3$F, or the like. Each of the foregoing compounds may include a rare earth dopant that is not provided with the chemical formula.

In still a further embodiment, the scintillation compound can be a metal-oxygen-sulfur compound. The metal metal-oxygen-sulfur compound can be a single metal oxysulfide or a mixed metal oxysulfide, wherein the metal oxysulfide includes a combination of metals as principal constituents. In an embodiment, the metal-oxygen-sulfur compound can be a metal oxysulfide, such as a rare earth metal oxysulfide.

Below are non-limiting, exemplary formulas for families of compounds.

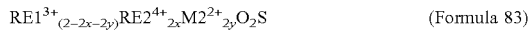
(Formula 83)

wherein:
RE1$^{3+}$ is a trivalent rare earth element;
M2$^{2+}$ is a divalent metal element;
RE2$^{4+}$ is a tetravalent rare earth element;
x and y are greater than or equal to 0 and less than or equal to 0.2; and
(x+y) is greater than or equal to 0.0001 and less than 0.2.

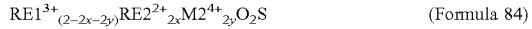
(Formula 84)

wherein:
RE1$^{3+}$ is a trivalent rare earth element;
M2$^{4+}$ is a tetravalent metal element;
RE2$^{4+}$ is a divalent rare earth element;
x and y are greater than or equal to 0 and less than or equal to 0.2; and
(x+y) is greater than or equal to 0.0001 and less than 0.2.

Exemplary compounds that can be modified in accordance with the above-referenced formulas include Gd$_2$O$_2$S, La$_2$O$_2$S, or the like. Each of the foregoing compounds may include a rare earth dopant that is not provided with the chemical formula.

In yet a further embodiment, the scintillation compound can be a metal-oxygen-halogen compound. The metal metal-oxygen-halogen compound can be a single metal oxysulfide or a mixed metal oxysulfide, wherein the metal oxysulfide includes a combination of metals as principal constituents. In an embodiment, the metal-oxygen-halogen compound can be a metal oxyhalide, such as a rare earth metal oxyhalide.

Below are non-limiting, exemplary formulas for families of compounds.

(Formula 85)

wherein:
RE1$^{3+}$ is a trivalent rare earth element;
M$^{2+}$ is a divalent metal element;
RE2$^{4+}$ is a tetravalent rare earth element;
X is a halogen;
x and y are greater than or equal to 0 and less than or equal to 0.2; and
(x+y) is greater than or equal to 0.0001 and less than 0.2.

(Formula 86)

wherein:
RE1$^{3+}$ is a trivalent rare earth element;
M$^{4+}$ is a tetravalent metal element;
RE2$^{4+}$ is a divalent rare earth element;
X is a halogen;
x and y are greater than or equal to 0 and less than or equal to 0.2; and
(x+y) is greater than or equal to 0.0001 and less than 0.2.

Exemplary compounds that can be modified in accordance with the above-referenced formulas include GdOBr, GdOCl, GdOF, GdOI, LaOBr, LaOCl, LaOF, LaOI, LuOBr, LuOCl, LuOF, LuOI, YOBr, YOCl, YOF, or the like. Each of the foregoing compounds may include a rare earth dopant that is not provided with the chemical formula.

Many scintillation compounds are disclosed herein and are to illustrate, and not limit, scintillation compounds that can be used. After reading this specification, skilled artisans will appreciate that other scintillation compounds may be used, wherein such other scintillation compounds include a rare earth element as a principal constituent or as a dopant.

In the formulas above, each element that is designated by a valance state may be single element or a combination of elements having the same valance state. For example, M$^{1+}_3$ in a formula may be any one of the Group 1 elements (for example, Li$_3$, Na$_3$, K$_3$, Rb$_3$, or Cs$_3$), Ag, or could be a combination of such elements (for example, Cs$_2$Li, Cs$_2$Na, Rb$_2$Li, or the like). M$^{2+}_2$ in a formula may be any one of the Group 2 elements (for example, Be$_2$, Mg$_2$, Ca$_2$, Sr$_2$, or Ba$_2$), or could be a combination of such elements (for example, CaMg, CaSr, SrBa, or the like). A metal in a trivalent state may be a Group 13 element, a rare earth element in the trivalent state, or a combination thereof. For example, a scintillator compound can include or a rare earth aluminum garnet, and M$^{3+}$ may be used for both the rare earth element and Al. A metal in a tetravalent state may be Zr, Hf, or a combination thereof. Similar to the metal elements, X$_2$ in a formula may represent a single halogen (for example, F$_2$, Cl$_2$, Br$_2$, or I$_2$) or a combination of halogens (for example, ClBr, BrI, or the like). Thus, except for dopant(s), if any, the scintillation compound can be a substantially single metal compound, a mixed metal compound, or a mixed halogen compound.

The scintillation compound can be in the form of a single crystal or as a polycrystalline material. The scintillation compound in the form of a single crystal may be formed using a fusion zone technique, a Czochralski, a Bridgman, or an edge feed growth (EFG) technique. With the fusion zone technique, a solid material can be processed such that a crystal seed is in contact with one end of the solid, and a heat source causes a local region (portion of the solid) to become molten near the crystal. The temperature of the ambient near the molten material be at a temperature of at least approximately 1600° C. or least 1800° C., and may be no greater than approximately 2200° C., or no greater than approximately 2100° C. As the heat source moves away from the crystal, the molten portion becomes monocrystalline, and a new local region farther from the seed crystal becomes molten. The process is continued until the rest of the solid has become crystallized. The solid can be oriented in a vertical or horizontal direction during the process. The particular crystal growth methods as melting zone and floating zone are belonging to general notation known as fusion zone technique. The fusion zone technique may be able to incorporate a higher level of dopant than the Czochralski or Bridgman growth techniques, as volatilization or segregation of species may limit the ability of how much dopant will be in the crystal. The scintillation compound can be in the form of a polycrystalline material. Such materials can be formed using calcining, pressing, sintering, or any combination thereof. In an embodiment, a polycrystalline powder (obtained by hydrothermal method or by precipitation in alkaline solution or by vapor phase), the powder possibly being compacted with or without the use of a binder or thermally densified or assembled by a sol-gel method. In a further embodiment, the compound can be a monocrystalline or polycrystalline fiber (obtained by micro-pulling down or by EFG), or thin film (obtained by CVD), or a polycrystalline glass-ceramic. The scintillating compound may be incorporated in a host material that may be transparent, such as a glass or a plastic or a liquid or a crystal. The host material may be used to excite indirectly the scintillating compound.

Depending on the composition of the scintillation compound, the scintillation compound may be exposed to a reducing ambient or an oxidizing ambient. When the scintillation compound includes a rare earth element that is present in a divalent state and a trivalent state, such a compound may be formed using a reducing ambient. In an embodiment, a scintillator compound may include Eu may be in divalent state, $Eu^{2+}$, and a trivalent state, $Eu^{3+}$. When a divalent rare earth element is used, a tetravalent element, such as Zr or Hf, may also be used. Because Zr and Hf do not have or are not readily reduced to a trivalent state, the likelihood of reducing Zr or Hf in the reducing ambient is substantially zero when forming the scintillation compound having a rare earth metal in the divalent state.

The reducing ambient may include a reducing species, an inert gas, or a combination thereof. The reducing species can include $H_2$, $N_2H_4$, $CH_4$, and another suitable reducing species or the like. If $CH_4$ is used as a reducing species, $O_2$ may be added so that CO would be formed at the formation temperature. In an embodiment, the reducing ambient includes at least approximately 1.1 vol %, at least approximately 2 vol %, at least approximately 4 vol % of the reducing species, and in another embodiment, the reducing ambient includes no greater than 100 vol %, no greater than approximately 75 vol %, no greater than approximately 50 vol %, no greater than approximately 20 vol %, or no greater than approximately 9 vol % of the reducing species. In terms of absolute pressure, in an embodiment, the reducing ambient comprises at least approximately 1.1 kPa, at least approximately 2 kPa, at least approximately 4 kPa of the reducing species, and in another embodiment, the reducing ambient includes no greater than 101 kPa, no greater than approximately 75 kPa, no greater than approximately 50 kPa, no greater than approximately 20 kPa, or no greater than approximately 9 kPa of the reducing species.

The inert gas can include a noble gas, such as He, Ne, Ar, another noble gas, or any combination thereof. In an embodiment, the reducing ambient includes at least approximately 1.1 vol %, at least approximately 5 vol %, at least approximately 11 vol %, at least approximately 15 vol %, or at least approximately 20 vol % of the inert gas, and in another embodiment, the reducing ambient includes no greater than 100 vol %, no greater than approximately 90 vol %, no greater than approximately 75 vol %, no greater than approximately 50 vol %, or no greater than approximately 40 vol % of the inert gas. The reducing ambient may only include an inert gas, may include substantially no oxygen, or a combination thereof. In a particular embodiment, the inert gas can include at least approximately 50% Ar, and in another particular embodiment, the reducing ambient includes a total reducing species concentration no greater than approximately 5 vol % and a remainder of the reducing ambient comprises Ar. The reducing ambient may include $O_2$ in a range of approximately 0.0001 vol % to approximately 3% vol %. Such a reducing ambient may have $O_2$ present to reduce the likelihood of forming defects in the scintillation compound, but not so high as to further oxidize an element that is to be reduced.

The oxidizing ambient can include $O_2$, $O_3$, NO, $N_2O$, $CO_2$, or any combination thereof. In an embodiment, the oxidizing ambient includes at least approximately 1.4 vol %, at least approximately 5 vol %, at least approximately 11 vol %, at least approximately 15 vol %, or at least approximately 20 vol % of an oxidizing species, and in another embodiment, the oxidizing ambient includes no greater than 100 vol %, no greater than approximately 90 vol %, no greater than approximately 75 vol %, no greater than approximately 50 vol %, no greater than approximately 40 vol %, or no greater than approximately 30 vol % of an oxidizing species. In terms of absolute pressure, in an embodiment, the oxidizing ambient comprises at least approximately 1.4 kPa, at least approximately 5 kPa, at least approximately 11 kPa, at least approximately 15 kPa, or at least approximately 20 kPa of an oxidizing species, and in another embodiment, the oxidizing ambient includes no greater than 101 kPa, no greater than approximately 90 kPa, no greater than approximately 75 kPa, no greater than approximately 50 kPa, or no greater than approximately 40 kPa of an oxidizing species. In a particular embodiment, the oxidation conditions can be achieved by electrical discharge in the material, and in another particular embodiment, annealing may be performed using air alone.

If needed or desired, an anneal may be performed after forming the scintillation compound. The anneal may be performed using any of the ambients previously described. The temperature for the anneal may be at least approximately 1100° C. or at least approximately 1200° C., and may be at no greater than approximately 1600° C. or no greater than approximately 1500° C.

In a particular embodiment in which the scintillation composition includes a cerium-doped rare earth silicate, growing or annealing conditions may be selected such that the scintillation compound is not reduced such that the absorbance at 357 nm becomes less than the absorbance at 280 nm.

The scintillation compound can be used to form a scintillator or other scintillation device useful in many apparatuses. FIG. 1 illustrates an embodiment of an apparatus 100 that includes a scintillator 122, a light guide 124, a photosensor 126, and control unit 128. The scintillator 122 can include a scintillation compound as previously described. The light guide 124 is substantially transparent to scintillating light emitted by the scintillator 122. The photosensor 126 can generate electrons in response to receiving scintillating light from the scintillator 122. The photosensor 126 can be a photomultiplier, a photodiode, an avalanche diode, or the like. The scintillator 122, the light guide 124, and the photosensor 126 are optically coupled together. Although the scintillator 122, the light guide 124, and the photosensor 126 are illustrated as being spaced apart, the light guide 124 may directly contact the scintillator 122 or the photosensor 126. In another embodiment, a coupling material, such as a substantially clear silicone gel may be used to couple the scintillator 122, the light guide 124, and the photosensor 126 together. The scintillator 122, the light guide 124, and the photosensor 126 may be located inside one or more housings so that ambient light or other undesired radiation does not reach the photosensor 126. The control unit 128 is electrically coupled to the photosensor 126. During normal operation, radiation can be captured by the scintillator 122, and the scintillator 122 emits scintillating light in response to receiving the targeted radiation. The scintillating light is received by the photosensor 126 that generates an electronic signal that is transmitted to the control unit 128. The control unit 128 includes hardware, firmware, or software that is configured so that the control unit 128 can generate information regarding the targeted radiation, such as the type of radiation (x-rays, gamma-rays, beta particles, and the like), intensity of the radiation, location of where the radiation was captured or where the radiation originated, or any combination thereof.

The apparatus can be a radiation detection apparatus, such as a medical imaging apparatus, a well logging apparatus, a security inspection apparatus, or the like. In a particular embodiment, the radiation detection system can be used for gamma ray analysis, such as a Single Positron Emission Computer Tomography (SPECT) or Positron Emission Tomography (PET) analysis. In another embodiment, the scintillation compound may be used for other applications outside of radiation detection. For example, the apparatus can include a luminescence emitter, especially monochromatic, for UV spectra, visible and IR, as for a wavelength conversion system, for example a laser device. In such a device, a control unit can be coupled to the scintillator 122, and the light guide 124 and photosensor 126 can be replaced by a lens or another suitable optical feature. Yet another apparatus that can use the scintillation compound can include an optical data storage device.

Scintillation compounds as described in accordance with the concepts described herein have unusually good light output, energy resolution, linearity, decay time, and afterglow properties. Linearity refers to how well a scintillation crystal approaches perfect linear proportionality between radiation energy and light output. The linearity can be measured as a departure from perfect linearity. A scintillation crystal having perfect linearity would always create the same number of photons per unit energy absorbed, regardless of the energy of the radiation. Thus, its departure from perfect linearity is zero. In an embodiment, a scintillation compound can have an afterglow of less than 200 ppm after 100 ms relative to the intensity measured during an x-ray irradiation. In a particular embodiment, an improvement with less afterglow may be accompanied by a reduction in the decay time and an increase in light yield. The presence of a rare earth element in a divalent or tetravalent state with an electronic charge compensating material can allow a scintillation compound to maintain electronic charge balance, yet still achieve benefits of having the rare earth element in the divalent or tetravalent state.

A non-limiting embodiment is described to illustrate better the current understanding of how concepts described herein are applicable to scintillation compounds. A rare earth aluminum garnet, such as LuAG, can be formed and include at least some rare earth element in the tetravalent state, $Ce^{4+}$ within the finished scintillation compound. If too much $Ce^{4+}$ is added without any electronic charge compensating species, the LuAG compound may have too many oxygen vacancies that can act as electron traps. When radiation is captured, electrons within the LuAG compound become excited. Some electrons will return to a lower energy state and emit scintillating light, which is desired; however, other electrons become trapped and do not emit light when trapped. The electrons may become untrapped due to temperature and emit light referred to as thermoluminescence. Thus, the electron traps are problematic because electrons that become trapped will not emit scintillating light at the time when electrons outside the traps emitting scintillating light, and electrons released from the traps will emit light but it will be at a time after the scintillating light from non-trapped electrons was emitted. By maintaining better electronic charge balance, oxygen vacancies may be less likely to trap electrons. Continuing with the prior example, a Group 2 element, such as Ca, Mg, Sr, or the like, can be incorporated into the scintillation compound. The Group 2 element is in a divalent state and does not or is not readily oxidized. Thus, the LuAG compound can be formed in an oxidizing ambient sufficient to achieve a desired concentration of $Ce^{4+}$ without a significant risk of forming oxygen vacancies while still maintaining better electronic charge balance at least in part due to the presence of the Group 2 element that is not readily oxidized. The addition of a rare earth element in a tetravalent state can obviate a step in the scintillation mechanism in many scintillation compounds. The modified scintillation mechanism consists of the interaction of cerium in 4+ state with high energy X-ray or γ-photons and converting $Ce^{4+}$ directly into excited (3+)* state together with generating of a hole. Divalent elements are participating in the scintillation mechanism having a particular role of hole traps.

Ideally, a pair of rare earth metal atoms in a trivalent state is replaced by a rare earth atom in a tetravalent state and a metal atom in a divalent state, such as a Group 2 element. In practice, with respect to replacing rare earth metal atoms in a trivalent state, the ratio of rare earth atoms in a tetravalent state to metal atoms in a divalent state does not need to be 1:1, since not all the dopant atoms are participating in scintillation mechanism and thus, some electronic charge imbalance does not deviate from the concepts are described herein. Better performance may result as the ratio is kept closer to 1:1.

Similar concepts can apply when rare earth elements are reduced. In another non-limiting embodiment, a pair of rare earth metal atoms in a trivalent state is replaced by a rare earth atom in a divalent state and a metal atom in a tetravalent state. A particular compound can include $CaLaB_7O_{13}$. Some of the La, which is in a trivalent state, may be replaced by $Eu^{2+}$ and Zr, Hf, or a combination thereof. Zr and Hf are in a tetravalent state and are not readily reduced. Thus, the replacement of La with $Eu^{2+}$ and Zr or Hf allows for better electronic charge balance, particularly when the scintillation compound is exposed to a reducing ambient, for example, to keep the $Eu^{2+}$ from being oxidized to $Eu^{3+}$.

In a further non-limiting embodiment, a pair of metal atoms in a divalent state is replaced by a rare earth atom in a trivalent state and a metal atom in a monovalent state, such as a Group 1 element or Ag. A particular compound can include $CaI_2$. Some of the Ca, which is in a divalent state, may be replaced by $Eu^{2+}$ and Li, Na, or K, or a combination thereof. The Group 1 elements are in a monovalent state and are not readily reduced. Thus, the replacement of Ba with $Eu^{2+}$ and Li, Na, or K allows for better electronic charge balance, particularly when the scintillation compound is exposed to a reducing ambient, for example, to keep the $Eu^{2+}$ from being oxidized to $Eu^{3+}$.

The presence of $Ce^{4+}$ can be determined from crystal samples polished on their two parallel sides, through which sides the spectrophotometric operation was carried out. The distance between these parallel sides (thickness of the sample) may be from 0.2 to 50 mm. In a particular embodiment, the samples are nominally 1 mm thick. A Cary 6000i-brand spectrophotometer measuring in the UV and in the visible, marketed by Varian under the trade name Cary 6000i, and having a resolution of less than or equal to 1 nm, may be used. The direct transmission mode was used on the samples. Samples were measured using an interval of 0.5 nm, an acquisition time of 0.1 s per point and an SBW (spectral bandwidth) of 2 nm. Absorbance (also called the optical density) of each sample is measured as a function of wavelength between 190 nm and 600 nm. Background noise is subtracted before determining a ratio of the absorbance at 357 nm to the absorbance at 280 nm, referenced $A_{357}/A_{280}$.

FIG. 2 includes the absorbance spectra in the case of sample 2 (referenced "2" in the figure) after an air annealing (according to an embodiment) and in the case of sample 1 (referenced "1" in the figure), a reference sample, representative of the prior art, which is not annealed. In the case of sample 2, after an air annealing, an absorbance maximum is observed at 250 nm, the origin of which is $Ce^{4+}$.

FIG. 3 compares the thermoluminescence intensity of a compound in the case of sample 2 (referenced "2") after an air annealing and in the case of sample 1 (unannealed reference sample, referenced "1") representative of the prior art. In the case of the sample 2, a very substantial drop in the thermoluminescence intensity, especially around 300 K, is noticed, and thus, afterglow is reduced.

References have been published that disclose the addition of dopants to improve the performance of scintillator crystals. US 2011/0204240 teaches that Ca is added so that $Ce^{4+}$ forms $Ce^{3+}$ in cerium-doped lutetium yttrium orthosilicate (LYSO:Ce). Clearly, $RE^{4+}$ has been undesired in the prior art. Unlike the teachings of the prior art, a rare earth element can be intentionally kept in a divalent or tetravalent state and achieve the benefits of such state while still maintaining electronic charge balance.

In an embodiment, a scintillation compound may be substantially clear. In another embodiment, the color change may be quantified by determining a color difference between a scintillation compound in accordance with any of the embodiments described herein may be compared to its corresponding base compound when both are illuminated by substantially white light. As used herein, a corresponding base compound has a substantially the same composition as the scintillation compound, except that all of its scintillating light activator in a valance state different from a conventional activator for the particular scintillation compound. For example, scintillation compound may have $RE^{3+}$ (e.g., $Ce^{3+}$) as a conventional activator; however, a scintillation compound in accordance with an embodiment may have $Ce^{4+}$ or a combination of $Ce^{3+}$ and a significant amount of $Ce^{4+}$ as a scintillating light activator. The corresponding base compound would have all of the cerium as $Ce^{3+}$ with substantially no or an insignificant amount of $Ce^{4+}$. In another example, another scintillation compound may have $RE^{2+}$ (e.g., $Eu^{2+}$) as a conventional activator; however, another scintillation compound in accordance with an embodiment may have $Eu^{3+}$ or a combination of $Eu^{2+}$ and $Eu^{3+}$ as a scintillating light activator. The corresponding base compound would have all of the europium as $Eu^{2+}$ with substantially no or an insignificant amount of $Eu^{3+}$.

Samples for color change evaluation may be used as formed, have a surface polished, fractured roughed, or have another suitable sample preparation performed. White light may be directed such that it is directed perpendicular to surface, at an angle other than perpendicular to the surface, or from a plurality of light sources oriented at different angles with respect to the surface. One or more different techniques may be used to determine color change.

In an embodiment, CIE 1976 color space coordinates, L*, a*, and b* can be used. The CIE 1976 color space coordinates may be obtained using a Cary 6000i-brand spectrophotometer from Varian, now part of Agilent Technologies, Inc. The scintillation compound reflects substantially white light at color space coordinates of L1*, a1*, b1* that correspond to CIE 1976 color space coordinates L*, a*, and b* for the scintillation compound. The corresponding base compound reflects substantially white light at color space coordinates of L2*, a2*, b2* that correspond to CIE 1976 color space coordinates L*, a*, and b* for the corresponding base compound. The color difference between the scintillation compound and the base compound may be such that |a1*−a2*| is no greater than approximately 9, and |b1*−b2*| is no greater than approximately 9. In another embodiment, |a1*−a2*| is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01, and |b1*−b2*| is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01. In a further embodiment, |L1*−L2*| is no greater than approximately 9, no greater than approximately 5, is no greater than approximately 3, is no greater than approximately 2, is no greater than approximately 1.5, is no greater than approximately 0.9, is no greater than approximately 0.5, or is no greater than approximately 0.2.

As an alternative to color space coordinates, the wavelength of reflected light may be used. The scintillation compound reflects substantially white light at a first wavelength, and its corresponding base compound reflects substantially white light at a second wavelength. In an embodiment, first and second wavelengths are no greater than approximately 50 nm from each other, no greater than approximately 30 nm, no greater than approximately 20 nm, no greater than approximately 15 nm, no greater than approximately 9 nm, no greater than approximately 5 nm, no greater than approximately 2 nm from each other.

In still another embodiment, a particular spectrum of wavelengths may be used. In one example, a scintillation compound is colorless when sufficiently electronic charge balanced, and a similar scintillator compound has a yellow color if not sufficiently electronic charge balanced. The intensity of the reflected light at wavelengths from 400 nm to 700 nm for the scintillator compounds may be compared. A color change may be determined if the data significantly differ. Alternatively, only blue light (for example, light having an emission maximum at a wavelength in a range of 400 nm to 450 nm) may be used to illuminate the scintillation compounds. The scintillation compound that is colorless may reflect substantially more of the blue light as compared to the scintillation compound that has the yellow color.

In another example, a different scintillation compound has a yellow color when sufficiently electronic charge balanced, and yet another similar scintillator compound has a green color if not sufficiently electronic charge balanced. The intensity of the reflected light at wavelengths from 400 nm to 700 nm for the scintillator compounds may be compared. An analysis may be performed with different color lights. A first set of data may be obtained when, only green light (for example, light having an emission maximum at a wavelength in a range of 500 nm to 550 nm) is used to illuminate the scintillation compounds. A second set of data may be obtained when, only red light (for example, light having an emission maximum at a wavelength in a range of 650 nm to 700 nm) is used to illuminate the scintillation compounds. The scintillation compound that is yellow may reflect substantially more of the red light and less of the green light as compared to the scintillation compound that has the green color.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

Embodiments may be in accordance with any one or more of the items as listed below.

Item 1. A material comprising a rare earth (Ln) silicate doped with an element RE different from Ln, RE being chosen among Ce, Pr, Tb, wherein the element RE is at least partially in its 4+ oxidation state ($RE^{4+}$), the quantity of $RE^{4+}$ in said material being comprised between 0.0001% and 0.1% in mass.

Item 2. The material according to the previous Item, wherein the material is a scintillation material.

Item 3. The material according to the previous Item, wherein the material has an afterglow of less than 200 ppm after 100 ms relative to the intensity measured during an X-ray irradiation.

Item 4. The material according to one of the previous Items, wherein the quantity of $RE^{4+}$ in the material is in a range of 0.0005% and 0.05% in mass.

Item 5. The material according to one of the previous Items wherein the molar ratio $RE^{4+}/(RE^{3+}+RE^{4+})$ is in a range of 0.05 and 1.

Item 6. The material according to one of the previous Items, wherein the quantity of RE in said material is in a range of 0.001% and 0.1% in mass.

Item 7. The material according to one of the previous Items, wherein it has the formula $Ln_{(2-z-x1-x2)}RE^{3+}{}_{x1}RE^{4+}{}_{x2}M_zM'_vSi_{(p-v)}O_{(3+2p)}$ in which:
Ln represents a rare earth different than RE;
M represents a divalent alkaline-earth element;
M' represents a trivalent element such as Al, Ga, Sc or In;
(z+v) is greater than or equal to 0.0001 and lower than or equal to 0.2;
z is greater than or equal to 0 and lower than or equal to 0.2;
v is greater than or equal to 0 and lower than or equal to 0.2;
x1 is greater than or equal to 0.00005 and lower than 0.1;
x2 is greater than or equal to 0.00005 and lower than 0.1;
x2/(x1+x2) is greater than or equal to 0.05 and lower than 1;
x1+x2 is lower than 0.1; and
p equals 1 or 2.

Item 8. The material according to the previous Item, wherein x1 is greater than or equal to 0.0005 and lower than 0.01 and x2 is greater than or equal to 0.0005 and lower than 0.01.

Item 9. The material according to one of the two previous Items, wherein z is lower than or equal to 0.1.

Item 10. The material according to one of the Items 7 to 9, wherein x2/(x1+x2) is greater than or equal to 0.1.

Item 11. The material according to one of the Items 7 to 10, wherein z is greater than or equal to 0.00003.

Item 12. The material according to one of the previous Items, wherein the silicate is an orthosilicate.

Item 13. The material according to one of the previous Items wherein the rare earth Ln is Y, La, Pr, Nd, Sm, Eu, Gd, Tb, Dy, Ho, Er, Tm, Yb, Lu, or any combination thereof.

Item 14. The material according to one of the previous Items wherein RE is cerium.

Item 15. The material according to the previous Item wherein:
Ln is Y, La, Gd, Er, Ho, Lu, or any combination thereof;
M is Ca, Mg, Sr, Ba, or any combination thereof;
z is greater than or equal to 0.00003 and lower than or equal to 0.1;
x1 is greater than or equal to 0.00005 and lower than 0.01;
x2 is greater than or equal to 0.00005 and lower than 0.01; and
x2/(x1+x2) is greater than or equal to 0.1 and lower than or equal to 1.

Item 16. The material according to one of the Items 1 to 12 wherein RE is Praseodymium.

Item 17. The material according to the previous Item, wherein:
Ln is Y, La, Gd, Er, Ho, Lu, or any combination thereof;
M is Ca, Mg, Sr, Ba, or any combination thereof;
z is greater than or equal to 0.00003 and lower than or equal to 0.1;
x1 is greater than or equal to 0.00005 and lower than 0.01;
x2 is greater than or equal to 0.00005 and lower than 0.01; and
x2/(x1+x2) is greater than or equal to 0.1 and lower than or equal to 1.

Item 18. A scintillation material according to Item 14 or 15, wherein the scintillation material's absorbance at a wavelength of 357 nm is less than the scintillation material's absorbance at 280 nm.

Item 19. The scintillation material according to the previous Item, wherein cerium represents 0.005 mol % to 20 mol % of all the rare earths included in the scintillation material.

Item 20. The scintillation material according to one of the Items 18 to 20, wherein the scintillation material is codoped with a divalent alkaline earth element M or a trivalent metal M'.

Item 21. The scintillation material according to the previous Item, wherein the scintillation material is codoped with a divalent alkaline earth element M present in a proportion from 0.0025 mol % to 15 mol % of the sum of all the rare earths included in the scintillation material.

Item 22. The scintillation material according to one of the two previous Items, wherein the sum of the masses of the codopants in the scintillation material is less than the mass of cerium in the scintillation material.

Item 23. The scintillation material according to one of the three previous Items, wherein the scintillation material is codoped with a trivalent metal M' in a proportion from 0.005 mol % to 25 mol % of the sum of the moles of silicon and of trivalent metal codopant included in the scintillation material.

Item 24. A scintillation material comprising a cerium-doped rare-earth silicate, wherein an absorbance of the scintillation material at a wavelength of 357 nm is less than an absorbance of the scintillation material at 280 nm.

Item 25. The scintillation material according to the preceding Item, wherein the scintillation material has an afterglow of less than 200 ppm after 100 ms relative to the intensity measured during an X-ray irradiation.

Item 26. The scintillation material according to either of the two preceding Items, wherein the cerium represents 0.005 mol % to 20 mol % of all the rare earths included in the scintillation material.

Item 27. The scintillation material according to one of Items 24 to 26, wherein the scintillation material is codoped with a divalent alkaline earth element M or a trivalent metal M'.

Item 28. The scintillation material according to preceding Item, wherein the scintillation material is codoped with a divalent alkaline earth element M present in a proportion from 0.0025 mol % to 15 mol % of the sum of all the rare earths included in the scintillation material.

Item 29. The scintillation material according to either of the two preceding Items, wherein a sum of the masses of the codopants in the scintillation material is less than the mass of cerium, and even less than 0.1 times the mass of cerium, in the scintillation material.

Item 30. The scintillation material according to either of the two preceding Items, wherein the scintillation material is codoped with a trivalent metal M' in a proportion from 0.005 mol % to 25 mol % of the sum of the moles of silicon and of trivalent metal codopant included in the scintillation material.

Item 31. The scintillation material according to one of Items 24 to 30, wherein the rare earth element is Y, La, Pr, Nd, Sm, Eu, Gd, Tb, Dy, Ho, Er, Tm, Yb, Lu, or any combination thereof.

Item 32. The scintillation material according to one of Items 24 to 31, wherein the scintillation material has the formula $Ln_{(2-z-x)}Ce_xM_zSi_{(p-v)}M'_vO_{(3+2p)}$ in which:
Ln represents a rare earth;
M represents a divalent alkaline earth element;
M' represents a trivalent metal;
(z+v) is greater than or equal to 0.0001 and less than or equal to 0.2;
z is greater than or equal to 0 and less than or equal to 0.2;
v is greater than or equal to 0 and less than or equal to 0.2;
x is greater than or equal to 0.0001 and less than 0.1; and
p is equal to 1 or 2.

Item 33. The scintillation material according to one of Items 24 to 31, wherein the scintillation material has a formula of $Lu_{(2-y)}Y_{(y-z-x)}Ce_xM_zSi_{(1-v)}M'_vO_5$ in which:
M represents a divalent alkaline earth element;
M' represents a trivalent metal;
(z+v) is greater than or equal to 0.0001 and less than or equal to 0.2;
z is greater than or equal to 0 and less than or equal to 0.2;
v is greater than or equal to 0 and less than or equal to 0.2;
x is greater than or equal to 0.0001 and less than 0.1; and
y is from (x+z) to 1.

Item 34. The scintillation material according to the preceding Item, wherein y ranges from 0.08 to 0.3.

Item 35. The scintillation material according to one of the previous Items, wherein for a 1 mm thick sample having both sides polished and parallel, L* is greater than 93 and at most equal to 100, b* lies in the range from 0 to 0.4 and a* lies in the range from −0.1 to +0.1, L*, b* and a* being the color coordinates in CIE 1976, obtained using transmission measurement.

Item 36. A method for preparing a material according to one of the previous Items, which comprises an oxidizing heat treatment up to a temperature of in a range of 1100° C. to 2200° C. in an atmosphere containing at least 10 vol % of oxygen, followed by cooling that results in said material, said heat treatment and said cooling both being carried out in an atmosphere containing at least 10 vol % of oxygen when the temperature is greater than 1100° C. or when the temperature is greater than 1200° C.

Item 37. The method as claimed in previous Item wherein the oxidizing heat treatment is carried out in an atmosphere containing at least 20 vol % of oxygen.

Item 38. The method as claimed in one of the two preceding Items, wherein it comprises melting the raw materials in an atmosphere containing less than 5 vol % of oxygen followed by cooling that results in solidification, followed by the oxidizing heat treatment, which is carried out up to a temperature in a range of 1100° C. and 1600° C.

Item 39. The method as claimed in previous Item, wherein the melting of the raw materials is carried out in an atmosphere containing less than 1 vol % of oxygen.

Item 40. The method as claimed in one of the two preceding Items, wherein the solidification is a single crystal growth.

Item 41. An ionizing particle detector comprising a material from one of the materials claimed previously and a photosensor.

Item 42. A medical imaging apparatus comprising the detector of Item 41.

Item 43. A luminescence emitter, especially monochromatic, in UV, visible and IR spectra comprising a material from one of the materials claimed previously.

Item 44. A scintillation compound comprising a rare earth element in a tetravalent state at a concentration of at least approximately 10 ppm atomic of the scintillation compound, wherein the scintillation compound is a rare earth silicate compound.

Item 45. The scintillation compound of Item 44, wherein the rare earth element in the tetravalent state is at a concentration of at least approximately 11 ppm atomic, at least approximately 20 ppm atomic, at least approximately 50 ppm atomic, at least 60 ppm atomic, at least approximately 110 ppm atomic, at least approximately 150 ppm atomic, or at least approximately 200 ppm atomic of the scintillation compound.

Item 46. The scintillation compound of Item 44 or 45, wherein the rare earth element in the tetravalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 47. The rare earth silicate compound of any one of Items 44 to 46, wherein the rare earth element is a particular rare earth element in the tetravalent state is at least approximately 5%, at least approximately 11%, at least approximately 15%, at least approximately 20%, at least approximately 35%, or at least approximately 30% of the total content of the particular rare earth element within the rare earth silicate compound.

Item 48. The scintillation compound of any one of Items 44 to 47, wherein the rare earth element is a particular rare earth element in the tetravalent state is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the scintillation compound.

Item 49. The scintillation compound of any one of Items 44 to 48, further comprising a dopant that includes a different element in a divalent state at a concentration of at least 5 ppm atomic.

Item 50. The scintillation compound of Item 49, wherein the dopant is at a concentration of at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the scintillation compound.

Item 51. The scintillation compound of any one of Items 44 to 50, wherein the dopant is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 52. The scintillation of any one of Items 44 to 51, wherein a ratio of the rare earth element in the tetravalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 53. The scintillation compound of any one of Items 44 to 52, wherein a ratio of the rare earth element in the tetravalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 54. The scintillation compound of any one of Items 44 to 53, wherein the rare earth element comprises $Ce^{4+}$.

Item 55. The scintillation compound of any one of Items 44 to 53, wherein the rare earth element comprises $Pr^{4+}$.

Item 56. The scintillation compound of any one of Items 44 to 53, wherein the rare earth element comprises $Tb^{4+}$.

Item 57. The scintillation compound of any one of Items 44 to 56, wherein the dopant comprises a Group 2 element.

Item 58. A scintillation compound comprising a rare earth element in a tetravalent state at a concentration of at least approximately 10 ppm atomic of the scintillation compound, wherein the scintillation compound is not a rare earth silicate compound.

Item 59. The scintillation compound of Item 58, wherein the rare earth element in the tetravalent state is at a concentration of at least approximately 11 ppm atomic, at least approximately 20 ppm atomic, at least approximately 50 ppm atomic, at least 60 ppm atomic, at least approximately 110 ppm atomic, at least approximately 150 ppm atomic, or at least approximately 200 ppm atomic of the scintillation compound.

Item 60. The scintillation compound of Item 58 or 59, wherein the rare earth element in the tetravalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 61. The scintillation compound of any one of Items 58 to 60, wherein the rare earth element is a particular rare earth element in the tetravalent state is at least approximately 5%, at least approximately 11%, at least approximately 15%, at least approximately 20%, at least approximately 35%, or at least approximately 30% of the total content of the particular rare earth element within the scintillation compound.

Item 62. The scintillation compound of any one of Items 58 to 61, wherein the rare earth element is a particular rare earth element in the tetravalent state is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the scintillation compound.

Item 63. The scintillation compound of any one of Items 58 to 62, further comprising a dopant that includes a different element in a divalent state at a concentration of at least 5 ppm atomic.

Item 64. The scintillation compound of Item 63, wherein the dopant is at a concentration of at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the scintillation compound.

Item 65. The scintillation compound of any one of Items 58 to 64, wherein the dopant is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 66. The scintillation compound of any one of Items 58 to 65, wherein a ratio of the rare earth element in the tetravalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 67. The scintillation compound of any one of Items 58 to 66, wherein a ratio of the rare earth element in the tetravalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 68. The scintillation compound of any one of Items 58 to 67, wherein the rare earth element comprises $Ce^{4+}$.

Item 69. The scintillation compound of any one of Items 58 to 67, wherein the rare earth element comprises $Pr^{4+}$.

Item 70. The scintillation compound of any one of Items 58 to 67, wherein the rare earth element comprises $Tb^{4+}$.

Item 71. The scintillation compound of any one of Items 58 to 70, wherein the dopant comprises a Group 2 element.

Item 72. A scintillation compound comprising:
a metal element in a trivalent state; and
a rare earth element in a divalent state at a concentration of at least approximately 10 ppm atomic of the scintillation compound, wherein, in a host matrix of the scintillator compound, at least a portion of the rare earth element in the divalent state replaces the metal element in the trivalent state.

Item 73. The scintillation compound of Item 72, wherein the rare earth element in the divalent state is at a concentration of at least approximately 20 ppm atomic, at least approximately 50 ppm atomic, at least approximately 110 ppm atomic, at least approximately 150 ppm atomic, or at least approximately 200 ppm atomic of the scintillation compound.

Item 74. The scintillation compound of Item 72 or 73, wherein the rare earth element in the divalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 75. The scintillation compound of any one of Items 72 to 74, wherein the rare earth element is a particular rare earth element in the divalent state that is at least approximately 5%, at least approximately 11%, at least approximately 15%, at least approximately 20%, at least approximately 35%, or at least approximately 30% of the total content of the particular rare earth element within the scintillation compound.

Item 76. The scintillation compound of any one of Items 72 to 75, wherein the rare earth element is a particular rare earth element in the divalent state that is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the scintillation compound.

Item 77. The scintillation compound of any one of Items 72 to 76, further comprising a dopant in a tetravalent state at the concentration of at least 5 ppm atomic of the scintillator compound.

Item 78. The scintillation compound of Item 77, wherein the dopant is at a concentration of at least approximately 20 ppm atomic, at least approximately 50 ppm atomic, at least approximately 110 ppm atomic, at least approximately 150 ppm atomic, or at least approximately 200 ppm atomic of the scintillation compound.

Item 79. The scintillation compound of any one of Items 72 to 78, wherein the dopant is at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 80. The scintillation compound of any one of Items 72 to 79, wherein a ratio of the rare earth element in the tetravalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 81. The scintillation compound of any one of Items 72 to 80, wherein a ratio of the rare earth element in the tetravalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 82. The scintillation compound of any one of Items 72 to 81, wherein the dopant comprises Zr, Hf, or any combination thereof.

Item 83. The scintillation compound of any one of Items 72 to 81, wherein the rare earth element comprises $Nd^{2+}$.

Item 84. The scintillation compound of any one of Items 72 to 81, wherein the rare earth element comprises $Sm^{2+}$.

Item 85. The scintillation compound of any one of Items 72 to 81, wherein the rare earth element comprises $Eu^{2+}$.

Item 86. The scintillation compound of any one of Items 72 to 81, wherein the rare earth element comprises $Dy^{2+}$.

Item 87. The scintillation compound of any one of Items 72 to 81, wherein the rare earth element comprises $Tm^{2+}$.

Item 88. The scintillation compound of any one of Items 72 to 81, wherein the rare earth element comprises $Yb^{2+}$.

Item 89. A scintillation compound comprising:
a metal element in a divalent state; and
a rare earth element in a trivalent state at a concentration of at least approximately 10 ppm atomic of the scintillation compound, wherein, in a host matrix of the scintillator compound, at least a portion of the rare earth element in the trivalent state replaces the metal element in the divalent state.

Item 90. The scintillation compound of Item 89, wherein the rare earth element in the trivalent state is at a concentration of at least approximately 20 ppm atomic, at least approximately 50 ppm atomic, at least approximately 110 ppm atomic, at least approximately 150 ppm atomic, or at least approximately 200 ppm atomic of the scintillation compound.

Item 91. The scintillation compound of Item 89 or 90, wherein the rare earth element in the trivalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 92. The scintillation compound of any one of Items 89 to 91, wherein the rare earth element is a particular rare earth element in the trivalent state is at least approximately 5%, at least approximately 11%, at least approximately 15%, at least approximately 20%, at least approximately 35%, or at least approximately 30% of the total content of the particular rare earth element within the scintillation compound.

Item 93. The scintillation compound of any one of Items 89 to 92, wherein the rare earth element is a particular rare earth element in the trivalent state is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the scintillation compound.

Item 94. The scintillation compound of any one of Items 89 to 93, wherein the dopant is in the monovalent state at the concentration of at least 5 ppm atomic.

Item 95. The scintillation compound of Item 94, wherein the dopant is at a concentration of at least approximately 20 ppm atomic, at least approximately 50 ppm atomic, at least approximately 110 ppm atomic, at least approximately 150 ppm atomic, or at least approximately 200 ppm atomic of the scintillation compound.

Item 96. The scintillation compound of any one of Items 89 to 95, wherein the dopant is at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the scintillation compound.

Item 97. The scintillation compound of any one of Items 89 to 96, wherein a ratio of the rare earth element in the divalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 98. The scintillation compound of any one of Items 89 to 97, wherein a ratio of the rare earth element in the divalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 99. The scintillation compound of any one of Items 89 to 98, wherein the dopant comprises a Group 1 element or Ag.

Item 100. The scintillation compound of any one of any one of Items 44 to 99, wherein the scintillation compound comprises a metal halide.

Item 101. The scintillation compound of Item 100, wherein, except for one or more dopants, if any of the one or more dopants are present, the metal halide is a single metal halide.

Item 102. The scintillation compound of Item 100, wherein the metal halide is a mixed metal halide.

Item 103. The scintillation compound of any one of Items 100 to 102, wherein the metal halide is a mixed halogen metal halide.

Item 104. The scintillation compound of any one of Items 44 to 99, wherein the scintillation compound comprises a metal-boron-oxygen compound.

Item 105. The scintillation compound of Item 104, wherein the metal-boron-oxygen compound comprises a metal borate.

Item 106. The scintillation compound of Item 104, wherein the metal-boron-oxygen compound comprises a metal oxyborate.

Item 107. The scintillation compound of any one of Items 44 to 99, wherein the scintillation compound comprises a metal-aluminum-oxygen compound, wherein the metal is different from aluminum.

Item 108. The scintillation compound of Item 107, wherein the metal-aluminum-oxygen compound comprises a metal aluminate.

Item 109. The scintillation compound of Item 107, wherein the metal-aluminum-oxygen compound comprises a metal aluminum garnet.

Item 110. The scintillation compound of any one of Items 44 to 99, wherein the scintillation compound comprises a metal-phosphorus-oxygen compound.

Item 111. The scintillation compound of Item 110, wherein the metal-phosphorus-oxygen compound comprises a metal phosphite.

Item 112. The scintillation compound of Item 110, wherein the metal-phosphorus-oxygen compound comprises a metal phosphate.

Item 113. The scintillation compound of Item 110, wherein the metal-phosphorus-oxygen compound comprises a Group 2 metal phosphate halide.

Item 114. The scintillation compound of any one of Items 44 to 99, wherein the scintillation compound comprises a metal-oxygen-sulfur compound.

Item 115. The scintillation compound of Item 114, wherein the metal-oxygen-sulfur compound comprises a metal oxysulfide.

Item 116. The scintillation compound of any one of Items 44 to 99, wherein the scintillation compound comprises a metal-oxygen-halogen compound.

Item 117. The scintillation compound of Item 116, wherein the metal-oxygen-halogen compound comprises a metal oxyhalide.

Item 118. A scintillation compound comprising a material represented by any one of Formulas 1 to 86, as presented in the Detailed Description.

Item 119. The scintillation compound of any one of Items 44 to 118, further comprising other atoms of the rare earth element in a trivalent state, wherein the other atoms are a principal constituent of scintillation compound.

Item 120. The scintillation compound of any one of Items 44 to 118, further comprising other atoms of the rare earth element in a trivalent state, wherein the other atoms is a co-dopant.

Item 121. The scintillation compound of any one of Items 44 to 120, wherein the scintillation compound has a greater light output, a smaller energy resolution, a lower afterglow, or a more proportional response over a range of radiation energies, or any combination thereof as compared to another scintillation compound having substantially a same composition except that substantially all of the rare earth element are in a trivalent state.

Item 122. The scintillation compound of any one of Items 44 to 121, wherein the scintillation compound is substantially monocrystalline.

Item 123. The scintillation compound of any one of Items 44 to 121, wherein the scintillation compound is a polycrystalline material.

Item 124. The scintillation compound of any one of Items 44 to 121, wherein the scintillation compound is substantially clear.

Item 125. The scintillation compound of any one of Items 44 to 124, wherein:
the scintillation compound is capable of reflecting substantially white light at color space coordinates of L1*, a1*, b1* that correspond to CIE 1976 color space coordinates L*, a*, and b* for the scintillation compound;
a corresponding base compound is capable of reflecting substantially white light at color space coordinates of L2*, a2*, b2* that correspond to CIE 1976 color space coordinates L*, a*, and b* for the corresponding base compound;
|a1*−a2*| is no greater than approximately 9; and
|b1*−b2*| is no greater than approximately 9.

Item 126. The scintillation compound of Item 125, wherein:
|a1*−a2*| is no greater than approximately 5, is no greater than approximately 3, is no greater than approximately 2, is no greater than approximately 1.5, is no greater than approximately 0.9, is no greater than approximately 0.5, is no greater than approximately 0.2, is no greater than approximately 0.09, no greater than approximately 0.05, or no greater than approximately 0.01; and
|b1*−b2*| is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01.

Item 127. The scintillation compound of Item 125 or 125, wherein |L1*−L2*| is no greater than approximately 9.

Item 128. The scintillation compound of Item 127, wherein |L1*−L2*| is no greater than approximately 5, is no greater than approximately 3, is no greater than approximately 2, is no greater than approximately 1.5, is no greater than approximately 0.9, is no greater than approximately 0.5, or is no greater than approximately 0.2.

Item 129. The scintillation compound of any one of Items 44 to 128, wherein:
the scintillation compound is capable of reflecting substantially white light at a first wavelength;
a corresponding base compound is capable of reflecting substantially white light at a second wavelength; and
the first and second wavelengths are no greater than approximately 50 nm from each other.

Item 130. The scintillation compound of Item 129, wherein the first and second wavelengths are no greater than approximately 30 nm, no greater than approximately 20 nm, no greater than approximately 15 nm, no greater than approximately 9 nm, no greater than approximately 5 nm, no greater than approximately 2 nm from each other.

Item 131. A radiation detection apparatus comprising:
a scintillator including the scintillation compound of any one of Items 44 to 130; and
a photosensor configured to receive scintillating light from the scintillator.

Item 132. The radiation detection apparatus of Item 131, wherein the radiation detection apparatus comprises a medical imaging apparatus, a well logging apparatus, or a security inspection apparatus.

Item 133. A positron emission tomography scanner comprising the scintillation compound of any one of Items 44 to 130.

Item 134. A laser device comprising the scintillation compound of any one of Items 44 to 130.

Item 135. An optical data storage device comprising the scintillation compound of any one of Items 44 to 130.

Item 136. A scintillation compound comprising a rare earth element in a divalent, trivalent, or tetravalent state at a concentration of the scintillation compound, wherein the scintillation compound has a greater light output, a smaller energy resolution, a lower afterglow, a shorter decay time, or a more proportional response over a range of radiation energies, or any combination thereof as compared to a corresponding base compound.

Item 137. The scintillation compound of Item 136, wherein the scintillation compound has a greater light output as compared to the corresponding base compound.

Item 138. The scintillation compound of Item 136 or 137, wherein the scintillation compound has a smaller energy resolution as compared to the corresponding base compound.

Item 139. The scintillation compound of any one of Items 136 to 138, wherein the scintillation compound has a lower afterglow as compared to the corresponding base compound.

Item 140. The scintillation compound of any one of Items 136 to 139, wherein the scintillation compound has a shorter decay time as compared to the corresponding base compound.

Item 141. The scintillation compound of any one of Items 136 to 140, wherein the scintillation compound has a more proportional response over a range of radiation energies, as compared to the corresponding base compound.

Item 142. A process of forming a scintillator compound comprising:
forming the scintillation compound in an oxidizing ambient such that, in a finished scintillation compound, a rare earth element is in a tetravalent state at a concentration of at least 10 ppm of the finished scintillation compound, and the finished scintillation compound does not include a rare earth silicate.

Item 143. The process of Item 142, wherein the oxidizing ambient comprises $O_2$, $O_3$, NO, $N_2O$, $CO_2$, or any combination thereof.

Item 144. The process of Item 142 or 143, wherein the oxidizing ambient comprises at least approximately 1.4 vol %, at least approximately 5 vol %, at least approximately 11 vol %, at least approximately 15 vol %, or at least approximately 20 vol % of an oxidizing species.

Item 145. The process of any one of Items 142 to 144, wherein the oxidizing ambient includes no greater than 100 vol %, no greater than approximately 90 vol %, no greater than approximately 75 vol %, no greater than approximately 50 vol %, or no greater than approximately 40 vol % of an oxidizing species.

Item 146. The process of any one of Items 142 to 145, wherein the oxidizing ambient comprises at least approximately 1.4 kPa, at least approximately 5 kPa, at least approximately 11 kPa, at least approximately 15 kPa, or at least approximately 20 kPa of an oxidizing species.

Item 147. The process of any one of Items 142 to 146, wherein the oxidizing ambient includes no greater than 101 kPa, no greater than approximately 90 kPa, no greater than approximately 75 kPa, no greater than approximately 50 kPa, or no greater than approximately 40 kPa of an oxidizing species.

Item 148. The process of any one of Items 142 to 147, wherein the rare earth element in the tetravalent state is at a concentration of at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 149. The process of any one of Items 142 to 148, wherein the rare earth element is in the tetravalent state at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 150. The process of any one of Items 142 to 149, wherein the rare earth element comprises a particular rare earth element in the tetravalent state that is at least approximately 5%, at least approximately 11%, at least approximately 15%, at least approximately 20%, at least approximately 35%, or at least approximately 30% of the total content of the particular rare earth element within the finished scintillation compound.

Item 151. The process of any one of Items 142 to 150, wherein the rare earth element comprises a particular rare earth element in the tetravalent state that is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the finished scintillation compound.

Item 152. The process of any one of Items 142 to 151, wherein the finished scintillation compound further comprises a dopant that includes a different element in a divalent state at a concentration of at least 5 ppm atomic.

Item 153. The process of Item 152, wherein the dopant is at a concentration of at least approximately 11 ppm atomic, at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 154. The process of any one of Items 142 to 153, wherein the dopant is at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 155. The process of any one of Items 142 to 154, wherein a ratio of the rare earth element in the tetravalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 156. The process of any one of Items 142 to 155, wherein a ratio of the rare earth element in the tetravalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 157. The process of any one of Items 142 to 156, wherein the rare earth element comprises $Ce^{4+}$.

Item 158. The process of any one of Items 142 to 156, wherein the rare earth element comprises $Pr^{4+}$.

Item 159. The process of any one of Items 142 to 156, wherein the rare earth element comprises $Tb^{4+}$.

Item 160. The process of any one of Items 142 to 159, wherein the dopant comprises a Group 2 element.

Item 161. A process of forming a scintillator compound comprising:
 forming the scintillation compound in a reducing ambient such that a finished scintillation compound comprises:
 a metal element in a trivalent state; and
 a rare earth element is in a divalent state at a concentration of at least 10 ppm of the finished scintillation compound, wherein, in a wherein, in a host matrix of the finished scintillator compound, at least a portion of the rare earth element in the divalent state replaces the metal element in the trivalent state.

Item 162. The process of Item 161, wherein the rare earth element in the divalent state is at a concentration of at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 163. The process of Item 161 or 162, wherein the rare earth element in the divalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 164. The process of any one of Items 161 to 163, wherein the rare earth element comprises a particular rare earth element in the divalent state that is at least approximately 5%, at least approximately 11%, at least approximately 15%, at least approximately 20%, at least approximately 35%, or at least approximately 30% of the total content of the particular rare earth element within the finished scintillation compound.

Item 165. The process of any one of Items 161 to 164, wherein the rare earth element comprises a particular rare earth element in the divalent state that is no greater than 100%, no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the finished scintillation compound.

Item 166. The process of any one of Items 161 to 165, further comprising a dopant in a tetravalent state at the concentration of at least 5 ppm atomic of the finished scintillation compound.

Item 167. The process of Item 166, wherein the dopant is at a concentration of at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 168. The process of Item 166 or 167, wherein the dopant is at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 169. The process of any one of Items 166 to 168, wherein a ratio of the rare earth element in the divalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 170. The process of any one of Items 166 to 169, wherein a ratio of the rare earth element in the divalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 171. The process of any one of Items 166 to 170, wherein the dopant comprises Zr, Hf, or any combination thereof.

Item 172. The process of any one of Items 161 to 171, wherein the rare earth element comprises $Nd^{2+}$.

Item 173. The process of any one of Items 161 to 171, wherein the rare earth element comprises $Sm^{2+}$.

Item 174. The process of any one of Items 161 to 171, wherein the rare earth element comprises $Eu^{2+}$.

Item 175. The process of any one of Items 161 to 171, wherein the rare earth element comprises $Dy^{2+}$.

Item 176. The process of any one of Items 161 to 171, wherein the rare earth element comprises $Tm^{2+}$.

Item 177. The process of any one of Items 161 to 171, wherein the rare earth element comprises $Yb^{2+}$.

Item 178. A process of forming a scintillation compound comprising:
forming the scintillation compound in a reducing ambient such that a finished scintillation compound comprises:
a metal element in a divalent state; and
a rare earth element is in a trivalent state at a concentration of at least 10 ppm of the finished scintillation compound wherein, in a host matrix of the scintillator compound, at least a portion of the rare earth element in the trivalent state replaces the metal element in the divalent state.

Item 179. The process of Item 178, wherein the rare earth element in the trivalent state is at a concentration of at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 180. The process of Item 178 or 179, wherein the rare earth element in the trivalent state is at a concentration no greater than approximately 5% atomic, no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 181. The process of any one of Items 178 to 180, wherein the rare earth element comprises a particular rare earth element in the trivalent state that is at least approximately 5%, at least approximately 11%, at least approximately 15%, at least approximately 20%, at least approximately 35%, or at least approximately 30% of the total content of the particular rare earth element within the finished scintillation compound.

Item 182. The process of any one of Items 178 to 181, wherein the rare earth element comprises a particular rare earth element in the trivalent state that is no greater than approximately 90%, no greater than approximately 75%, no greater than approximately 50%, no greater than approximately 40%, no greater than approximately 30%, no greater than approximately 25%, no greater than approximately 20%, no greater than approximately 15%, or no greater than approximately 9% of the total content of the particular rare earth element within the finished scintillation compound.

Item 183. The process of any one of Items 178 to 182, further comprising a dopant in a monovalent state at the concentration of at least 5 ppm atomic of the finished scintillation compound.

Item 184. The process of Item 183, wherein the dopant is at a concentration of at least approximately 20 ppm atomic, at least approximately 50 ppm atomic, at least approximately 110 ppm atomic, at least approximately 150 ppm atomic, or at least approximately 200 ppm atomic of the finished scintillation compound.

Item 185. The process of Item 183 or 184, wherein the dopant is at a concentration no greater than approximately 5000 ppm atomic, no greater than approximately 2000 ppm atomic, no greater than approximately 1500 ppm atomic, no greater than approximately 900 ppm atomic, no greater than approximately 800 ppm atomic, no greater than approximately 700 ppm atomic, no greater than approximately 600 ppm atomic, or no greater than approximately 500 ppm atomic of the finished scintillation compound.

Item 186. The process of any one of Items 183 to 185, wherein a ratio of the rare earth element in the divalent state to the dopant is at least approximately 1:90, at least approximately 1:50, at least approximately 1:20, at least approximately 1:9, at least approximately 1:5, at least approximately 1:3, at least approximately 1:2, or at least approximately 1:1.5, or at least approximately 1:1.1.

Item 187. The process of any one of Items 183 to 186, wherein a ratio of the rare earth element in the divalent state to the dopant is no greater than approximately 90:1, no greater than approximately 50:1, no greater than approximately 20:1, no greater than approximately 9:1, no greater than approximately 5:1, no greater than approximately 3:1, no greater than approximately 2:1, or at least approximately 1.5:1, or no greater than approximately 1.1:1.

Item 188. The process of any one of Items 183 to 187, wherein the dopant comprises a Group 1 element or Ag.

Item 189. The process of any one of Items 161 to 188, wherein the reducing ambient comprises a reducing species.

Item 190. The process of Item 189, wherein the reducing species comprises $H_2$, $N_2H4$, $CH_4$, or any combination thereof.

Item 191. The process of Item 189 or 190, wherein the reducing ambient comprises at least approximately 1.1 vol %, at least approximately 2 vol %, at least approximately 4 vol % of the reducing species.

Item 192. The process of any one of Items 189 to 191, wherein the reducing ambient comprises no greater than 100 vol %, no greater than approximately 75 vol %, no greater than approximately 50 vol %, no greater than approximately 20 vol %, or no greater than approximately 9 vol % of the reducing species.

Item 193. The process of any one of Items 189 to 192, wherein the reducing ambient comprises at least approximately 1.1 kPa, at least approximately 2 kPa, at least approximately 4 kPa of the reducing species.

Item 194. The process of any one of Items 161 to 193, wherein the reducing ambient comprises no greater than 101 kPa, no greater than approximately 75 kPa, no greater than approximately 50 kPa, no greater than approximately 20 kPa, or no greater than approximately 9 kPa of the reducing species.

Item 195. The process of any one of Items 161 to 194, wherein the reducing ambient further includes an inert gas.

Item 196. The process of Item 195, wherein the inert gas comprises a noble gas.

Item 197. The process of Item 195, wherein the inert gas comprises at least approximately 50% Ar.

Item 198. The process of any one of Items 195 to 197, wherein the reducing ambient comprises at least approximately 1.1 vol %, at least approximately 5 vol %, at least approximately 11 vol %, at least approximately 15 vol %, or at least approximately 20 vol % of the inert gas.

Item 199. The process of any one of Items 195 to 198, wherein the reducing ambient comprises no greater than 100 vol %, no greater than approximately 90 vol %, no greater than approximately 75 vol %, no greater than approximately 50 vol %, or no greater than approximately 40 vol % of the inert gas.

Item 200. The process of any one of Items 195 to 198, wherein the reducing ambient only includes an inert gas.

Item 201. The process of any one of Items 161 to 200, wherein the reducing ambient includes substantially no oxidizing species.

Item 202. The process of any one of Items 161 to 199, wherein the reducing ambient includes $O_2$ in a range of approximately 0.0001 vol % to approximately 3% vol %.

Item 203. The process of any one of Items 161 to 199 and 202, wherein the reducing ambient includes a total reducing species concentration no greater than approximately 5 vol % and a remainder of the reducing ambient comprises Ar.

Item 204. The process of any one of Items 142 to 203, further comprising charging a reactor with reactants that include a rare earth compound including the rare earth element.

Item 205. The process of any one of Items 142 to 204, wherein the scintillation compound is formed using a melting zone technique or a floating zone technique.

Item 206. The process of any one of Items 142 to 204, wherein the scintillation compound is formed using a Czochralski grown technique.

Item 207. The process of any one of Items 142 to 204, wherein the scintillation compound is formed using a Bridgman technique.

Item 208. The process of any one of Items 142 to 207, wherein the finished scintillation compound comprises a metal halide.

Item 209. The process of Item 208, wherein, except for one or more dopants, if any of the one or more dopants are present, the metal halide is a single metal halide.

Item 210. The process of Item 208, wherein the metal halide is a mixed metal halide.

Item 211. The process of any one of Items 208 to 210, wherein the metal halide is a mixed halogen metal halide.

Item 212. The process of any one of Items 142 to 207, wherein the finished scintillation compound comprises a metal-boron-oxygen compound.

Item 213. The process of Item 212, wherein the metal-boron-oxygen compound comprises a metal borate.

Item 214. The process of Item 212, wherein the metal-boron-oxygen compound comprises a metal oxyborate.

Item 215. The process of any one of Items 142 to 207, wherein the finished scintillation compound comprises a metal-aluminum-oxygen compound, wherein the metal is different from aluminum.

Item 216. The process of Item 215, wherein the metal-aluminum-oxygen compound comprises a metal aluminate.

Item 217. The process of Item 215, wherein the metal-aluminum-oxygen compound comprises a metal aluminum garnet.

Item 218. The process of any one of Items 142 to 207, wherein the finished scintillation compound comprises a metal-phosphorus-oxygen compound.

Item 219. The process of Item 218, wherein the metal-phosphorus-oxygen compound comprises a metal phosphite.

Item 220. The process of Item 218, wherein the metal-phosphorus-oxygen compound comprises a metal phosphate.

Item 221. The process of Item 218, wherein the metal-phosphorus-oxygen compound comprises a Group 2 metal phosphate halide.

Item 222. The process of any one of Items 142 to 207, wherein the finished scintillation compound comprises a metal-oxygen-sulfur compound.

Item 223. The process of Item 222, wherein the metal-oxygen-sulfur compound comprises a metal oxysulfide.

Item 224. The process of any one of Items 142 to 207, wherein the finished scintillation compound comprises a metal-oxygen-halogen compound.

Item 225. The process of Item 224, wherein the metal-oxygen-halogen compound comprises a metal oxyhalide.

Item 226. A process of any one of Items 142 to 225, wherein the scintillation compound comprises a material represented by any one of Formulas 1 to 86, as presented in the Detailed Description.

Item 227. The process of any one of Items 142 to 226, further comprising other atoms of the rare earth element in a trivalent state, wherein the other atoms are a principal constituent of scintillation compound.

Item 228. The process of any one of Items 142 to 226, further comprising other atoms of the rare earth element in a trivalent state, wherein the other atoms is a co-dopant.

Item 229. The process of any one of Items 142 to 228, wherein the finished scintillation compound has a greater light output, a smaller energy resolution, a lower afterglow, or a more proportional response over a range of radiation energies, or any combination thereof as compared to another scintillation compound having substantially a same composition except that substantially all of the rare earth element are in a trivalent state.

Item 230. The process of any one of Items 142 to 229, wherein the finished scintillation compound is substantially monocrystalline.

Item 231. The process of any one of Items 142 to 229, wherein the finished scintillation compound is a polycrystalline material.

Item 232. The process of any one of Items 142 to 229, wherein the finished scintillation compound is substantially clear.

Item 233. The process of any one of Items 142 to 232, wherein:
 the finished scintillation compound is capable of reflecting substantially white light at color space coordinates of L1*, a1*, b1* that correspond to CIE 1976 color space coordinates L*, a*, and b* for the scintillation compound;
 a corresponding base compound is capable of reflecting substantially white light at color space coordinates of L2*, a2*, b2* that correspond to CIE 1976 color space coordinates L*, a*, and b* for the corresponding base compound;
|a1*−a2*| is no greater than approximately 9; and
|b1*−b2*| is no greater than approximately 9.

Item 234. The process of Item 233, wherein:
|a1*−a2*| is no greater than approximately 5, is no greater than approximately 3, is no greater than approximately 2, is no greater than approximately 1.5, is no greater than approximately 0.9, is no greater than approximately 0.5, or is no greater than approximately 0.2; and
|b1*−b2*| is no greater than approximately 5, is no greater than approximately 3, is no greater than approximately 2, is no greater than approximately 1.5, is no greater than approximately 0.9, is no greater than approximately 0.5, or is no greater than approximately 0.2.

Item 235. The process of Item 233 or 234, wherein |L1*−L2*| is no greater than approximately 9.

Item 236. The process of Item 235, wherein |L1*−L2*| is no greater than approximately 5, is no greater than approximately 3, is no greater than approximately 2, is no greater than approximately 1.5, is no greater than approximately 0.9, is no greater than approximately 0.5, or is no greater than approximately 0.2.

Item 237. The process of any one of Items 142 to 236, wherein:
the scintillation compound is capable of reflecting substantially white light at a first wavelength;
a corresponding base compound is capable of reflecting substantially white light at a second wavelength; and
the first and second wavelengths are no greater than approximately 50 nm from each other.

Item 238. The process of Item 237, wherein the first and second wavelengths are no greater than approximately 30 nm, no greater than approximately 20 nm, no greater than approximately 15 nm, no greater than approximately 9 nm, no greater than approximately 5 nm, no greater than approximately 2 nm from each other.

Item 239. A radiation detection apparatus comprising:
a scintillator including the finished scintillation compound formed by the process of any one of Items 142 to 238; and
a photosensor configured to receive scintillating light from the scintillator.

Item 240. The radiation detection apparatus of Item 239, wherein the radiation detection apparatus comprises a medical imaging apparatus, a well logging apparatus, or a security inspection apparatus.

Item 241. A positron emission tomography scanner comprising the finished scintillation compound formed by the process of any one of Items 142 to 238.

Item 242. A laser device comprising the finished scintillation compound formed by the process of any one of Items 142 to 238.

Item 243. An optical data storage device comprising the finished scintillation compound formed by the process of any one of Items 142 to 238.

Item 244. The process of any one of Items 142 to 238, wherein the finished scintillation compound has a greater light output, a smaller energy resolution, a lower afterglow, a shorter decay time, or a more proportional response over a range of radiation energies, or any combination thereof as compared to a corresponding base compound.

Item 245. The process of Item 244, wherein the finished scintillation compound has a greater light output as compared to the corresponding base compound.

Item 246. The process of Item 244 or 245, wherein the finished scintillation compound has a smaller energy resolution as compared to the corresponding base compound.

Item 247. The process of any one of Items 244 to 246, wherein the finished scintillation compound has a lower afterglow as compared to the corresponding base compound.

Item 248. The process of any one of Items 244 to 247, wherein the finished scintillation compound has a lower afterglow as compared to the corresponding base compound.

Item 249. The process of any one of Items 244 to 248, wherein the finished scintillation compound has a more proportional response over a range of radiation energies, as compared to the corresponding base compound.

EXAMPLES

The concepts described herein will be further described in the Examples, which do not limit the scope of the invention described in the claims. The Examples demonstrate performance of scintillation crystals of different compositions. Numerical values as disclosed in this Examples section may be approximated or rounded off for convenience.

Examples 1 to 5

Lu, Y, Ce, and Si oxides and optional codopants, such as Mg, Al, or Sr oxides or Ca carbonate were placed into an iridium crucible in the proportions shown in Table 1. The values in Table 1 are given in grams per kilogram of the total raw materials. All the compounds contain 10 at % of yttrium and 0.22 at % of cerium.

TABLE 1

|  | Comparative Example 1 (reference) | Example 2 | Example 3 | Example 4 | Example 5 |
|---|---|---|---|---|---|
| $Lu_2O_3$ | 811.66 | 811.50 | 811.39 | 811.65 | 811.66 |
| $Y_2O_3$ | 51.16 | 51.16 | 51.16 | 51.16 | 51.17 |
| $CeO_2$ | 0.86 | 0.86 | 0.86 | 0.85 | 0.86 |
| $SiO_2$ | 136.32 | 136.25 | 136.41 | 136.32 | 136.19 |
| $CaCO_3$ | — | 0.23 | — | — | — |
| SrO | — | — | — | 0.02 | — |
| MgO | — | — | 0.18 | — | — |
| $Al_2O_3$ | — | — | — | — | 0.12 |

The charges were heated above their melting point (about 2050° C.) in a nitrogen atmosphere that was slightly oxidizing but contained less than 1% oxygen. A single crystal measuring one inch in diameter was grown using the Czochralski method. To do this, a mixture of the raw materials corresponding to the following compounds was used:

Comparative Example 1 (Reference without Codopant)

$Lu_{1.798}Y_{0.1976}Ce_{0.0044}SiO_5$;

Example 2

$Lu_{1.798}Y_{0.1956}Ca_{0.002}Ce_{0.0044}SiO_5$;

Example 3

$Lu_{1.798}Y_{0.1956}Mg_{0.002}Ce_{0.0044}SiO_5$;

Example 4

$$Lu_{1.798}Y_{0.1978}Sr_{0.002}Ce_{0.0022}SiO_5;\ \text{and}$$

Example 5

$$Lu_{1.798}Y_{0.1976}Ce_{0.0044}Si_{0.999}Al_{0.001}O_5.$$

The formulas for Examples 1 to 5 correspond to the raw materials introduced. The actual concentrations of Ce, Ca, Mg, Sr, and Al in the final crystal were lower than those introduced by the raw materials due to segregation during crystal formation. The samples of Examples 2 to 5 contain both $Ce^{3+}$ and $Ce^{4+}$. The respective quantities of Ca and Mg are referenced z' and z", (with z=z'+z").

The single crystals finally obtained, of formula:

$$Lu_{(2-y)}Y_{(y-z'-z''-v-x1-x2)}Ce^{3+}{}_{x1}Ce^{4+}{}_{x2}Ca_{z'}Mg_{z''}Sr_vSi_{1-u}Al_uO_5$$

had the following compositions in the boule head:

TABLE 2

| | Comparative Example 1 (reference) | Example 2 | Example 3 | Example 4 | Example 5 |
|---|---|---|---|---|---|
| x1 | 0.00106 | 0.00038 | 0.00043 | 0.00049 | 0.00047 |
| x2 | 0 | 0.00016 | 0.00011 | 0.00021 | 0.00011 |
| $Ce^{3+}$, ppm | 324 ppm | 116 | 132 | 150 | 140 |
| $Ce^{4+}$, ppm | 0 | 49 | 34 | 64 | 46 |
| x2/(x1 + x2) | 0 | 0.30 | 0.20 | 0.30 | 0.20 |
| Y | 0.2015 | 0.2016 | 0.2017 | 0.2016 | 0.2017 |
| z' | 0 | 0.00036 | 0 | 0.00010 | 0.00010 |
| z" | 0 | 0 | 0.00008 | 0 | 0 |
| v | 0 | 0 | 0 | 0.00003 | 0 |
| u | 0 | 0 | 0 | 0 | 0.00003 | and the following compositions in the boule heel:

TABLE 3

| | Comparative Example 1 (reference) | Example 2 | Example 3 | Example 4 | Example 5 |
|---|---|---|---|---|---|
| x1 | 0.00188 | 0.00130 | 0.00146 | 0.00103 | 0.00140 |
| x2 | 0 | 0.00058 | 0.00036 | 0.00045 | 0.00037 |
| $Ce^{3+}$, ppm | 575 | 398 | 447 | 315 | 450 |
| $Ce^{4+}$, ppm | 0 | 177 | 110 | 138 | 115 |
| x2/(x1 + x2) | 0 | 0.31 | 0.20 | 0.30 | 0.21 |
| y | 0.2010 | 0.2008 | 0.2008 | 0.2011 | 0.2011 |
| z' | 0 | 0.00047 | 0 | 0.00028 | 0.00024 |
| z" | 0 | 0 | 0.00048 | 0 | 0 |
| v | 0 | 0 | 0 | 0.00012 | 0 |
| u | 0 | 0 | 0 | 0 | 0.00012 |

Examples 6 to 9

Lu, Y, Ce and Si oxides and Ca carbonate were mixed in the following proportions:
Lu2O3: 97.393 g
Y2O3: 6.1415 g
CeO2: 0.1029 g
SiO2: 16.3585 g
CaCO3: 0.0062 g
resulting in a total mass of 120 g.

This mixture of raw materials corresponded to the following formula:

$$Lu_{1.798}Y_{0.1995}Ce_{0.0022}Ca_{0.0003}SiO_5.$$

This powder mixture was shaped into four, 3 mm diameter, 100 mm long cylindrical bars under an isostatic pressure of 700 kg/cm². These bars were then sintered in air at 1500° C. for 13 hours, ground once more into a powder and then reshaped into bars and sintered in air at 1500° C. for 20 hours. The succession of these two steps allowed the homogeneity of the bars prepared to be improved. Polycrystalline LYSO bars were thus obtained. These bars were then placed in a mirror furnace in a controlled atmosphere so as to obtain single crystals using an LYSO single-crystal seed of the same composition but without codopant. The controlled atmosphere was, depending on the circumstances, 100% $O_2$ or 21% $O_2$ in argon or 1.4% $O_2$ in argon or 100% argon (the % values are by volume). On account of the technique used (mirror furnace), the composition of the crystals obtained was identical to that corresponding to the raw materials introduced. Thus, four transparent colorless single crystals were obtained. They were cut and polished. The crystals obtained were such that their L* coordinate was greater than 93 for a 1 mm thick sample having both sides polished and parallel, their b* coordinate ranged from 0 to 0.4 for a 1 mm thick sample having both sides polished and parallel, and their a* coordinate ranged from −0.1 to +0.1 for a 1 mm thick sample having both sides polished and parallel.

The crystals obtained in Examples 1 to 9 were all transparent and colorless and such that their L* coordinates were greater than 93, and at most equal to 100, for a 1 mm thick sample having both sides polished and parallel, their b* coordinates ranged from 0 to 0.4 for a 1 mm thick sample having both sides polished and parallel, and their a* coordinates ranged from −0.1 to +0.1 for a 1 mm thick sample having both sides polished and parallel. At this stage, the crystals contained oxygen vacancies. After return to room temperature, the crystals were cut into 10×10×1 mm wafers. These crystals either underwent an anneal in air (oxidizing atmosphere) at 1500° C. for 48 hours, or a reducing anneal in argon containing 5% hydrogen at 1200° C. for 12 hours or no particular treatment was carried out. The large, parallel sides of the samples were then polished. The results of measurements on samples from the boule heel are collated in table 4. The afterglow values are given in ppm relative to the intensity measured during the X-ray irradiation.

TABLE 4

| | Growth atmosphere | Annealing atmosphere | $A_{357}/A_{280}$ | Afterglow at 100 ms (ppm) | $Ce^{4+}/(Ce^{3+} + Ce^{+4})$ x2/(x1 + x2) |
|---|---|---|---|---|---|
| Example 1 Reference | N2 <1% O2 | — | 2.7 | 270 | <0.05 |
| | N2 <1% O2 | Air | 2.5 | 237 | <0.05 |
| | N2 <1% O2 | Ar + 5% H2 | 4.5 | 646 | Not measured |
| Example 2 $Ca_{0.002}$ | N2 <1% O2 | — | 0.7 | 182 | 0.3 |
| | N2 <1% O2 | Air | 0.6 | 50 | 0.35 |
| | N2 <1% O2 | Ar + 5% H2 | 1.2 | 351 | Not measured |
| Example 3 $Mg_{0.002}$ | N2 <1% O2 | — | 1.2 | 436 | 0.17 |
| | N2 <1% O2 | Air | 0.9 | 84 | 0.20 |
| | N2 <1% O2 | Ar + 5% H2 | 1.9 | 889 | Not measured |
| Example 4 $Sr_{0.0004}$ | N2 <1% O2 | — | 0.8 | Not measured | 0.27 |
| | N2 <1% O2 | Air | 0.7 | Not measured | 0.30 |
| | N2 <1% O2 | Ar + 5% H2 | — | — | Not measured |

TABLE 4-continued

| | Growth atmosphere | Annealing atmosphere | $A_{357}/A_{280}$ | Afterglow at 100 ms (ppm) | $Ce^{4+}/(Ce^{3+} + Ce^{+4})$ $x2/(x1 + x2)$ |
|---|---|---|---|---|---|
| Example 5 $Al_{0.001}$ | N2 <1% O2 | — | 0.98 | Not measured | 0.17 |
| | N2 <1% O2 | Air | 0.82 | 117 | 0.21 |
| | N2 <1% O2 | Ar + 5% H2 | 2.07 | Not measured | Not measured |
| Examples 6 to 9 | 100% O2 | — | 0.5 | Not measured | Not measured |
| | Ar 21% O2 | — | 0.8 | | |
| | Ar 1.4% O2 | — | 0.6 | | |
| | Ar <1% O2 | — | 0.8 | | |

Next, the absorbances were measured as described in the examples above. The results of measurements on samples from the boule heel are collated in Table 4.

It may be seen that compounds of Examples 2 to 9, such that $A_{357}/A_{280}$ is <1, have a weak afterglow, lower than 200 ppm after 100 ins. As mentioned above, thermoluminescence can be used to demonstrate the property of afterglow. FIG. 3 compares the thermoluminescence intensity of a compound in the case of sample 2 (referenced "2" in the figure) after an air annealing according to the invention and in the case of sample 1 (referenced "1" in the figure, unannealed reference sample) representative of the prior art. These measurements were carried out using a heating rate of 20 K/min on compounds of the same geometry and surface finish (polished) and for the same irradiation time. A very substantial drop in the thermoluminescence intensity, especially around 300 K, is noticed in the case of the example according to the invention, this being characteristic of reduced afterglow In addition, crystals in accordance with embodiments as described herein, containing a substantial quantity of $Ce^{4+}$, have a better light yield than crystals containing substantially no $Ce^{4+}$. This increase in the light yield may be related to a decrease in the phenomenon of self-absorption. A few relative light yields (i.e., ratio of the light yield of the sample of the example to the light yield of the unannealed reference sample) characteristic of this improvement are given in Table 5.

TABLE 5

| Relative light yield | Example 1 (reference) | Example 2 | Example 3 | Example 4 |
|---|---|---|---|---|
| Unannealed | 1 | 1.19 | 1.12 | 1.14 |
| Annealed in air 1500° C./48 h | 1.13 | 2.28 | 1.30 | 1.36 |

Other measurements were made using gamma-ray excitation of the same crystals. These measurements were carried out using the pulse height method, the principle of which is the following: the crystal is optically coupled to a photomultiplier and coated with a plurality of polytetrafluoroethylene (PTFE) layers. Next, the crystal is excited using gamma-ray radiation from a $^{137}Cs$ (662 keV) source. The photons created by the scintillator are detected by the photomultiplier, which delivers a proportional response. This event is counted as an event in a channel of the detection apparatus. The number of the channel depends on the intensity and consequently on the number of photoelectrons created. A high intensity corresponds to a high channel value. The results are given in Table 6.

TABLE 6

| Light yield (channel) | Example 1 (reference) | Example 2 | Example 3 |
|---|---|---|---|
| Unannealed | 904 | 992 | 1099 |
| Annealed in air 1500° C./48 h | 890 | 1112 | 1333 |

Table 7 collates the percentage improvements in the decay times (i.e., reduced decay times) measured relative to a reference crystal annealed in air (reference example 1) for identical geometry and surface finish (polished) and geometries. For example, an improvement of 8% means that the decay time was reduced by 8%. The results presented in table 4 are given for crystals taken from the boule heel, annealed in air.

TABLE 7

| | Example 2 | Example 3 | Example 5 |
|---|---|---|---|
| Improvement in decay time (%) | 8% | 4.5% | 2.7% |

Further Examples

The examples below help to illustrate potential improvements with light yield (LY) and energy resolution for some exemplary compounds. All sample sizes are in mm, and energy resolution is based on full-width, half-maximum (FWHM) data.

Example of $LaCl_3$ Doped with Cerium:

| 10 × 10 × 10 mm cubes | $Ce^{4+}$ Content XANES | LY (Photons/MeV) $^{137}Cs$ 662 keV) | Energy resolution |
|---|---|---|---|
| $LaCl_3$: Ce | 50 ppm | 48000 | 4.7% |
| $LaCl_3$: Ce, $Ca^{2+}$ | 1250 ppm | 50500 | 4.5% |

Examples with CLYC Doped Cerium

| 10 × 10 × 10 mm cubes | $Re^{4+}$ content XANES | LY (Photons/MeV) $^{137}Cs$ 662 keV) | Energy resolution |
|---|---|---|---|
| $Cs_2LiYCl_6$: Ce | not detectable | 21000 | 6.6% |
| $Cs_2LiYCl_6$: Ce, $Ca^{2+}$ | 1200 ppm | 21000 | 6.2% |
| $Cs_2LiYCl_6$: Pr | not detectable | 10500 | 8.4% |
| $Cs_2LiYCl_6$: Pr: Ce, $Ca^{2+}$ | 900 ppm | 10500 | 8.0% |

Examples with CLLB Doped Cerium

| 10 × 10 × 10 mm cubes | $Re^{4+}$ Content XANES | LY (Photons/MeV $^{137}Cs$ 662 keV) | Energy resolution |
|---|---|---|---|
| $Cs_2LiLaBr_6$: Ce | not detectable | 34500 | 5.1% |
| $Cs_2LiLaBr_6$: Ce, $Ca^{2+}$ | 800 ppm | 36500 | 4.8% |
| $Cs_2LiLaBr_6$: Ce, $Sr^{2+}$ | 700 ppm | 36000 | 4.8% |
| $Cs_2LiLaBr_6$: Pr | not detectable | 16000 | 6.7% |
| $Cs_2LiLaBr_6$: Pr, $Sr^{2+}$ | 650 ppm | 17000 | 6.4% |

Examples with SrI$_2$ Doped Europium

| 2 × 6 × 6 mm | Re$^{3+}$ Content XANES | LY (Photons/MeV $^{137}$Cs 662 keV) | Energy resolution |
|---|---|---|---|
| SrI$_2$: 2% Eu | not detect | 98000 | 3.1% |
| SrI$_2$: 2% Eu, Cs$^{1+}$ | 400 ppm | 98000 | 2.9% |

Example of LYSO Doped with Cerium

| Composition | Percentage of Ce$^{3+}$ Optical estimation | Percentage of Ce$^{3+}$ XANES | Percentage of Ce$^{4+}$ Optical estimation | Percentage of Ce$^{4+}$ XANES |
|---|---|---|---|---|
| LYSO: Ce | 94% | — | 6% | — |
| LYSO: Ce, Mg$^{2+}$ | 74% | 80% | 26% | 20% |
| LYSO: Ce, Ca$^{2+}$ | 65% | 65% | 35% | 35% |

| 10 × 10 × 10 mm cubes | LY (Photons/MeV $^{137}$Cs 662 keV) | Energy resolution |
|---|---|---|
| LYSO: Ce | 28000 | 8.9% |
| LYSO: Ce, Mg$^{2+}$ | 33000 | 8.4% |
| LYSO: Ce, Ca$^{2+}$ | 34000 | 8.5% |

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A scintillation compound comprising a cerium-doped rare-earth silicate, wherein the cerium-doped rare-earth silicate is a scintillation material, and wherein an absorbance of the scintillation material at a wavelength of 357 nm is less than an absorbance of the scintillation material at 280 nm.

2. The scintillation compound of claim 1, wherein any rare earth other than cerium included in the material being one or more elements chosen from the group comprising: Y, La, Pr, Nd, Sm, Eu, Gd, Tb, Dy, Ho, Er, Tm, Yb, and Lu and wherein the scintillation compound is used within a radiation detection apparatus, a positron emission tomography scanner, a laser device, or an optical storage device.

3. The scintillation compound of claim 1, wherein the scintillation compound has an afterglow of less than 200 ppm after 100 ms relative to the intensity measured during an X-ray irradiation.

4. The scintillation compound of claim 3, wherein cerium representing 0.005 mol % to 20 mol % of all the rare earths included in the scintillation compound, any rare earth other than cerium included in the material being one or more elements chosen from the group comprising: Y, La, Pr, Nd, Sm, Eu, Gd, Tb, Dy, Ho, Er, Tm, Yb, and Lu.

5. The scintillation compound of claim 4, wherein the scintillation compound is codoped with a divalent alkaline earth M or a trivalent metal M'.

6. The scintillation compound of claim 5, wherein the mass of codopant in the scintillation compound is less than the mass of cerium in the scintillation compound.

7. The scintillation compound of claim 6, wherein the scintillation compound has color coordinates in the CIELAB space, obtained by transmission measurement using a 1 mm thick sample having both sides polished and parallel, such that L* is greater than 93 and at most equal to 100, b* lies in the range from 0 to 0.4 and a* lies in the range from −0.1 to +0.1.

8. The scintillation compound of claim 5, wherein the proportion of M' is between 0.005 mol % to 25 mol % of a sum of the moles of silicon and of the trivalent metal codopant.

9. The scintillation compound of claim 5, wherein a ratio of the rare earth element in the tetravalent state to the dopant M is at least approximately 1:90.

10. The scintillator compound of claim 5, wherein M is Ca.

11. A scintillation compound comprising a rare earth element in a tetravalent state at a concentration of at least approximately 10 ppm atomic of the scintillation compound, wherein the scintillation compound is a rare earth silicate compound.

* * * * *